United States Patent [19]

Couch

[11] Patent Number: 4,625,280

[45] Date of Patent: Nov. 25, 1986

[54] SECTIONAL DISTRESS ISOLATING ELECTROSTATIC ENGINE DIAGNOSTICS

[75] Inventor: Robert P. Couch, Palm Beach Gardens, Fla.

[73] Assignee: United Technologies Corporation, Hartford, Conn.

[21] Appl. No.: 454,115

[22] Filed: Dec. 28, 1982

[51] Int. Cl.[4] ............................................. G01M 15/00
[52] U.S. Cl. .............................. 364/431.02; 364/551; 73/116
[58] Field of Search ..................... 364/431.01, 431.02, 364/179, 424, 551, 552, 506–508; 324/379, 464; 73/116, 117.3; 340/627, 683

[56] References Cited

U.S. PATENT DOCUMENTS

| | | | |
|---|---|---|---|
| 3,731,070 | 5/1973 | Urban | 364/551 |
| 4,215,412 | 7/1980 | Bernier et al. | 364/431.02 |
| 4,249,238 | 2/1981 | Spang, III et al. | 364/431.02 |
| 4,280,185 | 7/1981 | Martin | 364/552 |
| 4,335,600 | 6/1982 | Wu et al. | 73/117.3 |
| 4,394,742 | 7/1983 | Crummer et al. | 73/117.3 |
| 4,418,388 | 11/1983 | Allgor et al. | 364/179 |
| 4,456,883 | 6/1984 | Bullis et al. | 324/464 |

Primary Examiner—Gary Chin
Attorney, Agent, or Firm—M. P. Williams

[57] ABSTRACT

Signals which exceed a threshold magnitude (FIGS. 8, 15 and 17) produced by the upstream-most one of a plurality of electrostatic probes (1, 2, 27, 3, FIG. 1) are utilized (FIGS. 14, 16 and 18) the section of the engine most likely to have produced the signal. This provides a diagnostic aid in determining the section of the engine which is most likely to have a component exhibiting abnormal wear, or other engine event.

2 Claims, 43 Drawing Figures

FIG. 57   PROB 1, CAT. 1
CMPRSR
METL/ABRAD. RUB
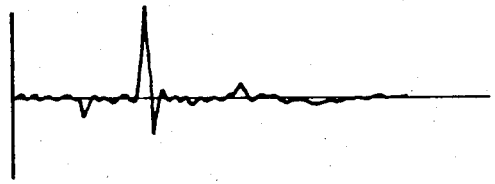
FIG. 58   PROB 1, CAT. 2
CMPRSR
METL/METL RUB
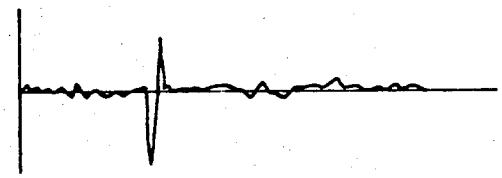
FIG. 59   PROB 1, CAT. 3
SURGE
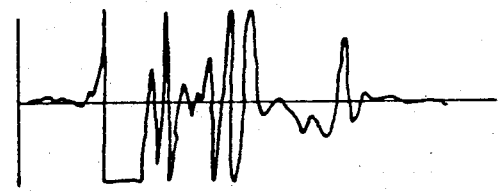
FIG. 60   PROB 1, CAT. 4
          PROB 2, CAT. 6
LOOSE PROB
ELECTRODE
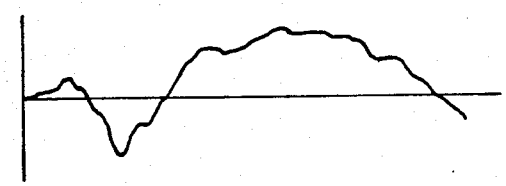
FIG. 61   PROB 1, CAT. 5
          PROB 2, CAT. 7
LOOSE PROB
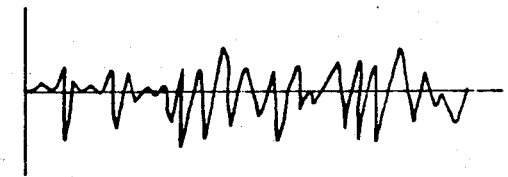
FIG. 62   PROB 1, CAT. 6
          PROB 2, CAT. 8
          PROB 3, CAT. 10
          PROB 4, CAT. 5
          RUB STRIP
          (ABRAD. SEAL)
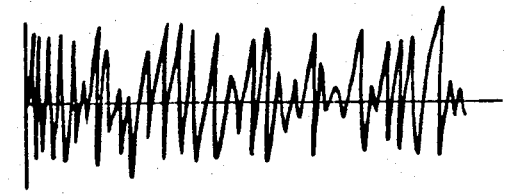

FIG. 63 PROB 2, CAT. 1 1ST HI TURB BLADE EROSN
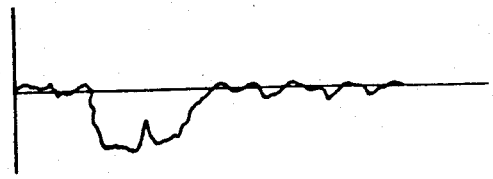
FIG. 64 PROB 2, CAT. 2 1ST HI TURB VANE EROSN
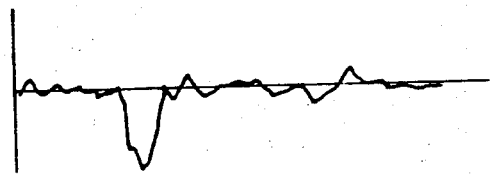
FIG. 65 PROB 2, CAT. 3 1ST HI TURB RUB
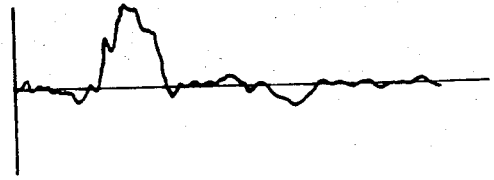
FIG. 66 PROB 2, CAT. 4 2ND HI TURB RUB
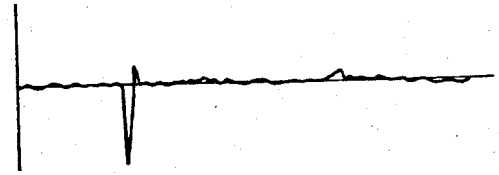
FIG. 67 PROB 2, CAT. 5 2ND HI TURB BLADE OR VANE EROSN
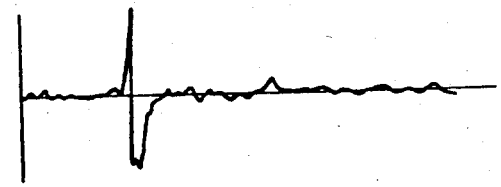

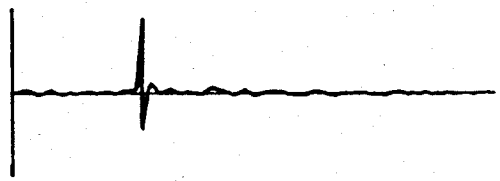
FIG. 68   PROB 3, CAT. 1
PROB 4, CAT. 1
FLAMING DEBRIS
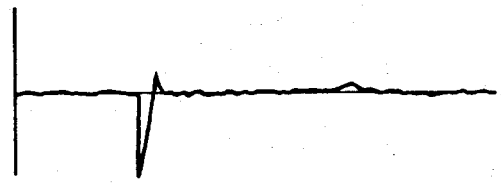
FIG. 69   PROB 3, CAT. 2
A/B NOZL LINER EROSN
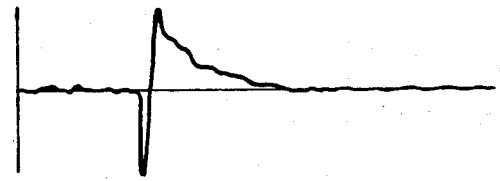
FIG. 70   PROB 3, CAT. 3
UNCORRELATED-1
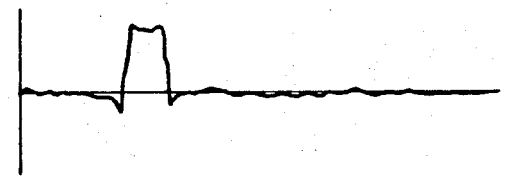
FIG. 71   PROB 3, CAT. 4
UNCORRELATED-2
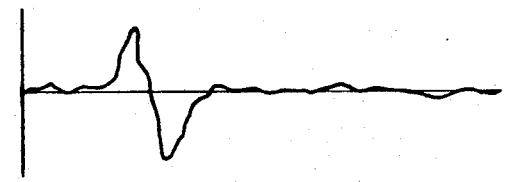
FIG. 72   PROB 3, CAT. 5
PROB 4, CAT. 2
HI TURB RUB
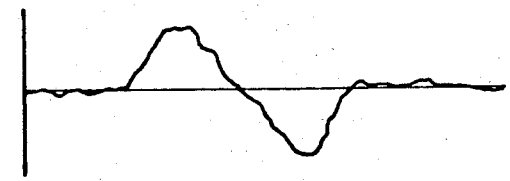
FIG. 73   PROB 3, CAT. 6
LO TURB RUB
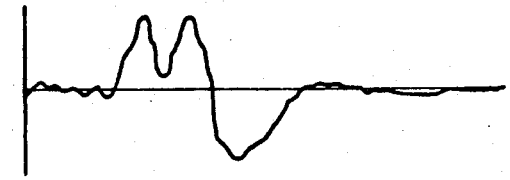
FIG. 74   PROB 3, CAT. 7
HI OR LO TURB
IMPACT-INDUCED RUB FIG. 75  PROB 3, CAT. 8
PROB 4, CAT. 4
HI TURB BLADE
EROSN
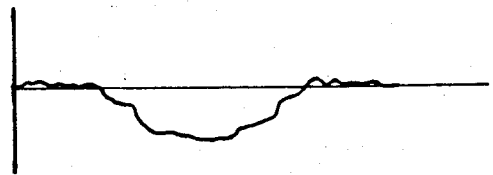
FIG. 76  PROB 3, CAT. 9
HI TURB VANE
EROSN
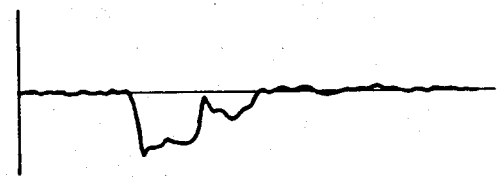
FIG. 77  PROB 3, CAT. 11
START OF
ABNORMAL
A/B CHOP
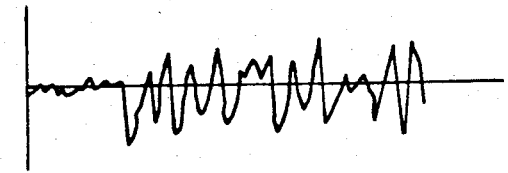
FIG. 78  PROB 3, CAT. 12
END OF
ABNORMAL
A/B CHOP
FIG. 79  PROB 3, CAT. 13
NORMAL
A/B CHOP
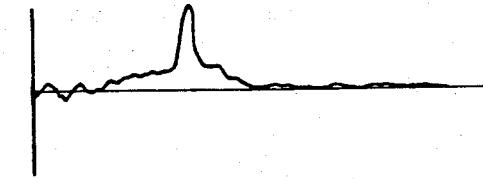
FIG. 80  PROB 3, CAT. 14
PROB 4, CAT. 6,7
ACEL/DECEL
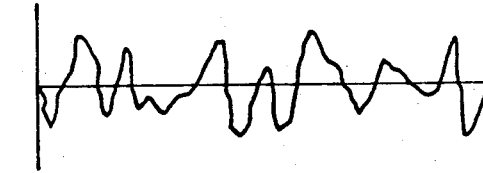

SECTIONAL DISTRESS ISOLATING ELECTROSTATIC ENGINE DIAGNOSTICS

TECHNICAL FIELD

This invention relates to electrostatic monitoring of gas turbine engines, and more particularly to identification of the particular section of the engine which is likely to be the source to electrostatic signals indicative of engine component wear.

BACKGROUND ART

There are a variety of methods known for generally determining the health of gas turbine engines, particularly aircraft engines. General engine condition, as well as an indication of engine life expectancy and need for overhaul, is provided by trending systems which utilize engine parameters such as various temperatures, pressures and control parameters associated therewith to determine current engine operating condition and impute engine health. However, such systems do not recognize isolated events within the engine which can be indicative of severe engine distress or impending engine component failure from a particular causal event.

Certain engine conditions can be determined visually, such as through borescopes, without tearing down the engine. As examples, severe blade erosion (high temperature corrosion), loss of abradable seal segments, or excessive rubbing can frequently be detected by borescope inspection methods. Additonally, periodic teardown of an engine allows inspection of far more components, much more reliably. Because engine teardown is such a complex and expensive proposition, various schemes are employed to determine when engine teardown should be performed. Tearing engines down too frequently is, of course, an extreme waste of time and money. Failure to tear down an engine when it may have problems could result in engines malfunctioning while in use. Because of the complexity and expense involved, any improvement in diagnostic methodology is of great value.

In the past decade, monitoring of the electrical characteristics of gas flowing through a jet engine has been studied as a possible indication of engine deterioration. Apparatus disclosed in U.S. Pat. No. 3,775,763 utilizes an electrostatic probe positioned in the exhaust of the jet engine, such as through the tail pipe wall. Abnormal conditions were thought to be coupled with small particles striking the probe and causing spikes of ion current of a relatively large magnitude. Subsequently, as reported by Couch, R.P.: "Detecting Abnormal Turbine Engine Deterioration Using Electrostatic Methods", *Journal of Aircraft*, Vol. 15, October 1978, pp 692-695, it was theorized that the signals did not result from individual particles of metal hitting the probe, but rather that the signals were indicative of Trichel pulses (a form of repetitive corona discharge) created by high potential pockets of excess charge. A probe set including circular insulated segments within the gas turbine engine tail pipe and a triangle of wire extending through the tail pipe exhaust gas path were developed. An oscillogram of a charge pocket signal caused by a rub, with the Trichel pulses filtered out, sensed by the ring and grid probes are shown in the article. With these probes, a normalized count of large signals (probe current, or voltage developed across an impedance, in excess of a threshold magnitude) over a period of time definitely correlated with impending engine component malfunctions or severe deterioration. As reported in the aforementioned article, however, the use of normalized counts of large magnitude signals from the ring and grid probe was thought to provide reliable prediction of only two out of three gas-path failures, at best, and distinction between possible causes thereof was highly experimental, as described below.

In the article, it is postulated that signals indicative, separately, of the plus pulse count and minus pulse count above a preset threshold from the ring probe and from the grid probe, as well as signals indicative of the area above a preset threshold in both the plus and minus directions (eight different signals in total), will provide signatures unique as to engine section, such as compressor, combustor, and turbine. The article reports that five failures had been observed to date with a unique distribution of counts. The attempt to develop unique engine section signatures from the count and size of plus and minus signals from the two different probes at the same station was abandoned.

In pursuit of a more satisfactory manner of acquiring and utilizing information related to electrostatic activity in the gas path of gas turbines, consideration was given to waveshapes of signals developed from electrostatic probes disposed in the gas stream of an engine. This effort evolved into techniques for acquiring waveshapes of electrostatic activity and analyzing them for correlation with causal engine events, as disclosed in a commonly owned, copending U.S. patent application entitled "Waveform Discriminated Electrostatic Engine Diagnostics", Ser. No. 454,124, filed contemporaneously herewith by Zwicke et al. As disclosed therein, complex data processing apparatus can provide a high degree of correlation of electrostatic signals produced in the gas stream of the engine with causal engine events, by means of discrimination of the signals as between corresponding categories, from certain pertinent characteristics of the signals. However, the apparatus disclosed in the aforementioned application does not provide a summarized indication of the section of the engine where the abnormal wear can be expected to be found. Additionally, the apparatus of the aforementioned application is extremely complex, and will not serve to provide inexpensive, or highly portable diagnostic information to aid in the determination of need for borescope inspection or tear down.

DISCLOSURE OF INVENTION

Objects of the invention include improvements in electrostatic diagnosis of gas turbine engines by indicating the likely section where abnormal wear has occurred; and provision of a relatively simple electrostatic diagnostic apparatus.

According to the present invention, the characteristics of signals provided by a plurality of electrostatic probes spaced apart from one another along the gas stream of the engine are utilized to provide an indication of the section of the engine where abnormal engine component wear has occurred. According to the invention in one form, classification of waveshapes into categories, such as by means shown in the aforementioned application or otherwise, is followed by summation of such information in a manner to indicate the upstream-most probe which produced most of the signals. According to the invention in another form, a simple digital apparatus is utilized to provide indications of positive and negative threshold crossings in response to signals provided by the probes, the maximum count of upstream-most threshold crossings being taken as an indication of the section of the engine where abnormal wear has most likely occurred. In accordance with yet another embodiment, simple analog apparatus is utilized to determine signals of excessive magnitude at probes spaced apart along the gas stream of the engine, counting the signals to provide an indication of the upstream-most probe having signals thereat, thereby to provide an indication of the section of the engine where abnormal wear has occurred.

The invention provides a summary indication of where engine wear has most likely occurred, and thereby is a useful aid in diagnosing gas turbine engines. The invention makes it possible to provide electrostatic engine diagnostics, indicative of the most likely section of engine wear, which are readily implemented with small, low cost apparatus.

The foregoing, and various other objects, features and advantages of the present invention will become more apparent in the light of the detailed description of exemplary embodiments thereof, as illustrated in the accompanying drawings.

Figure 3:
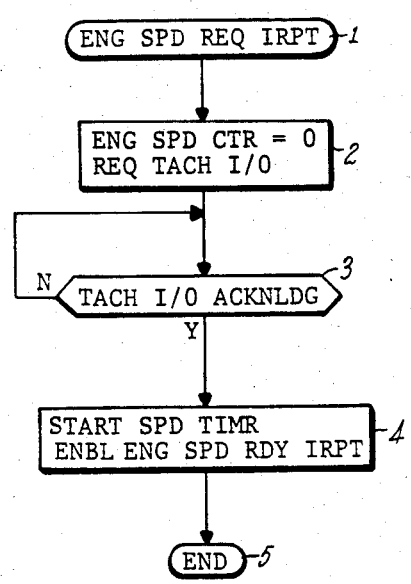
Figure 4:
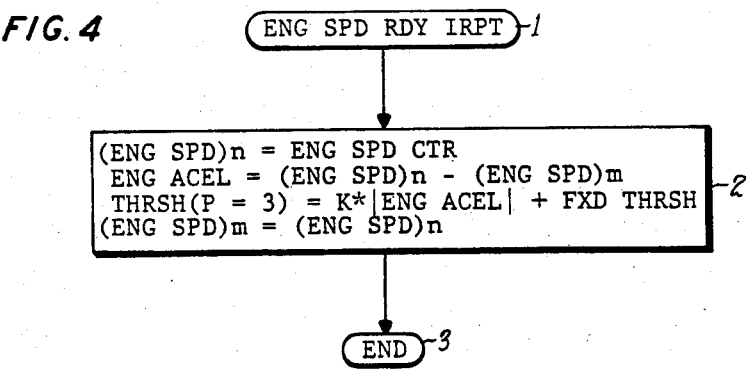
Figure 5:
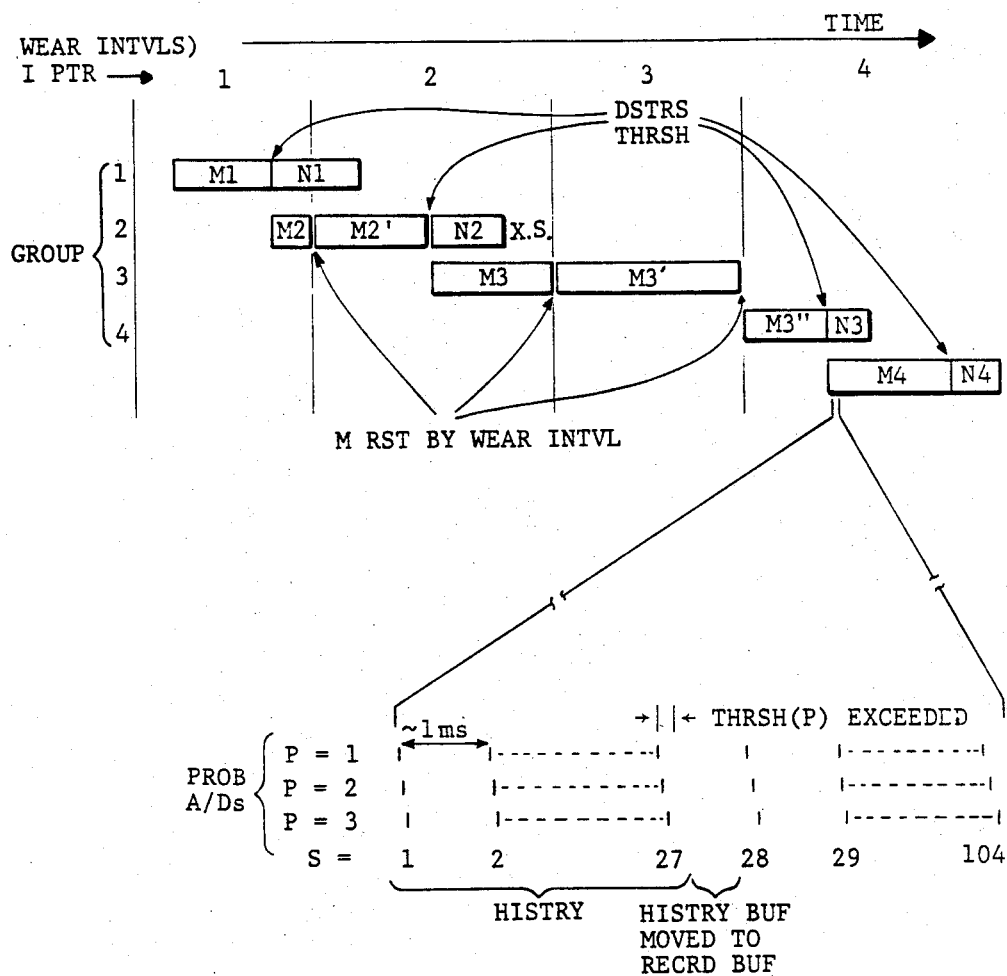
Figure 6:
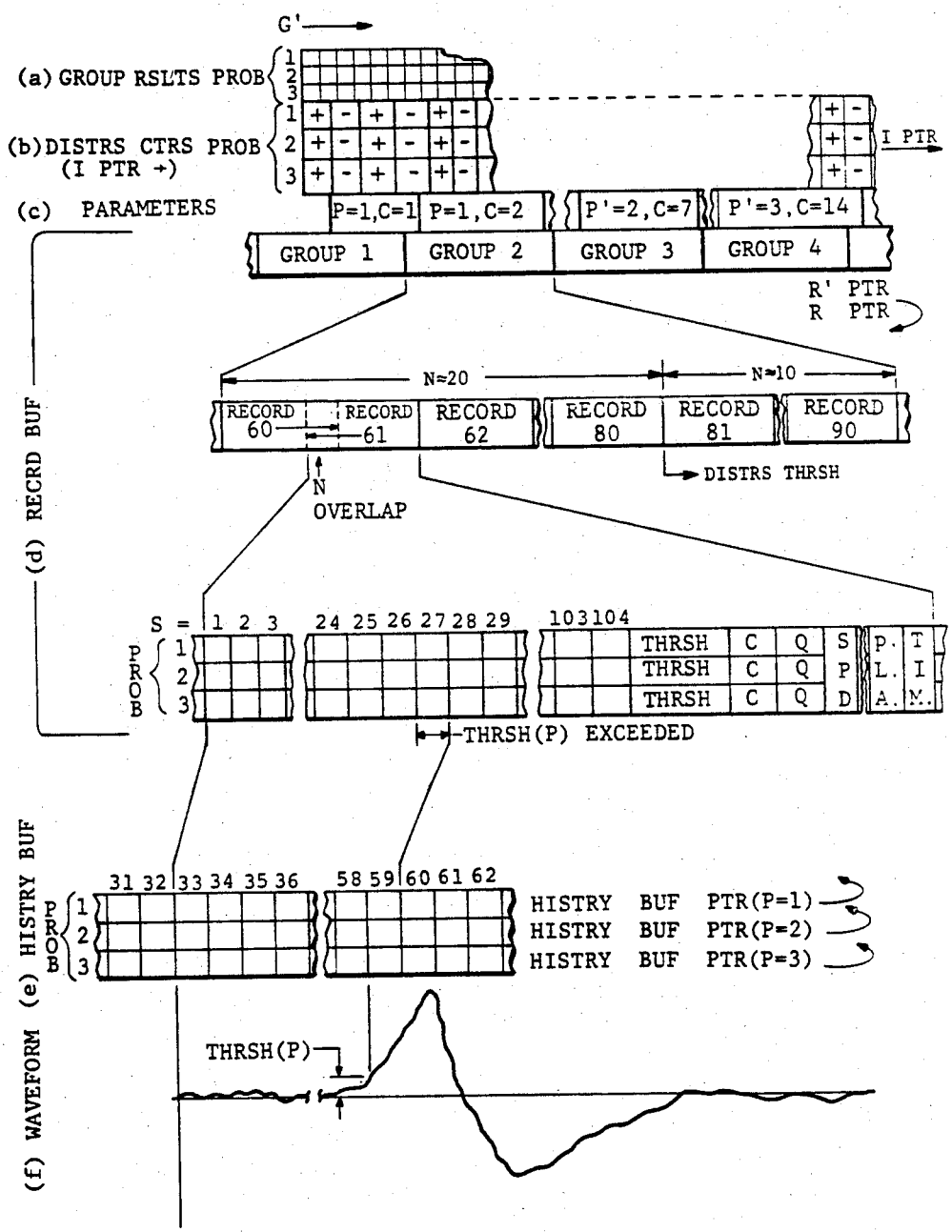
Figure 7:
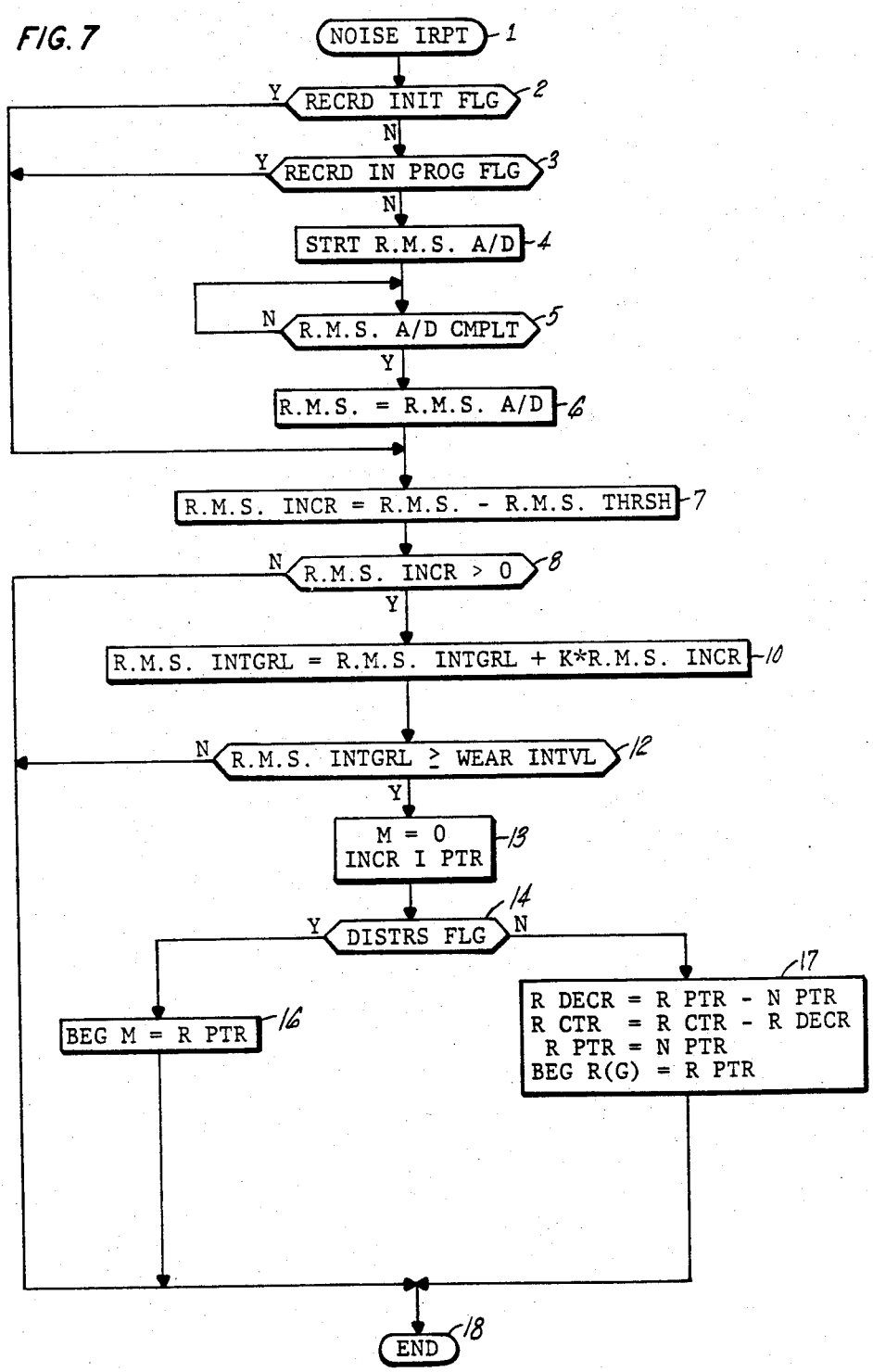
Figure 8:
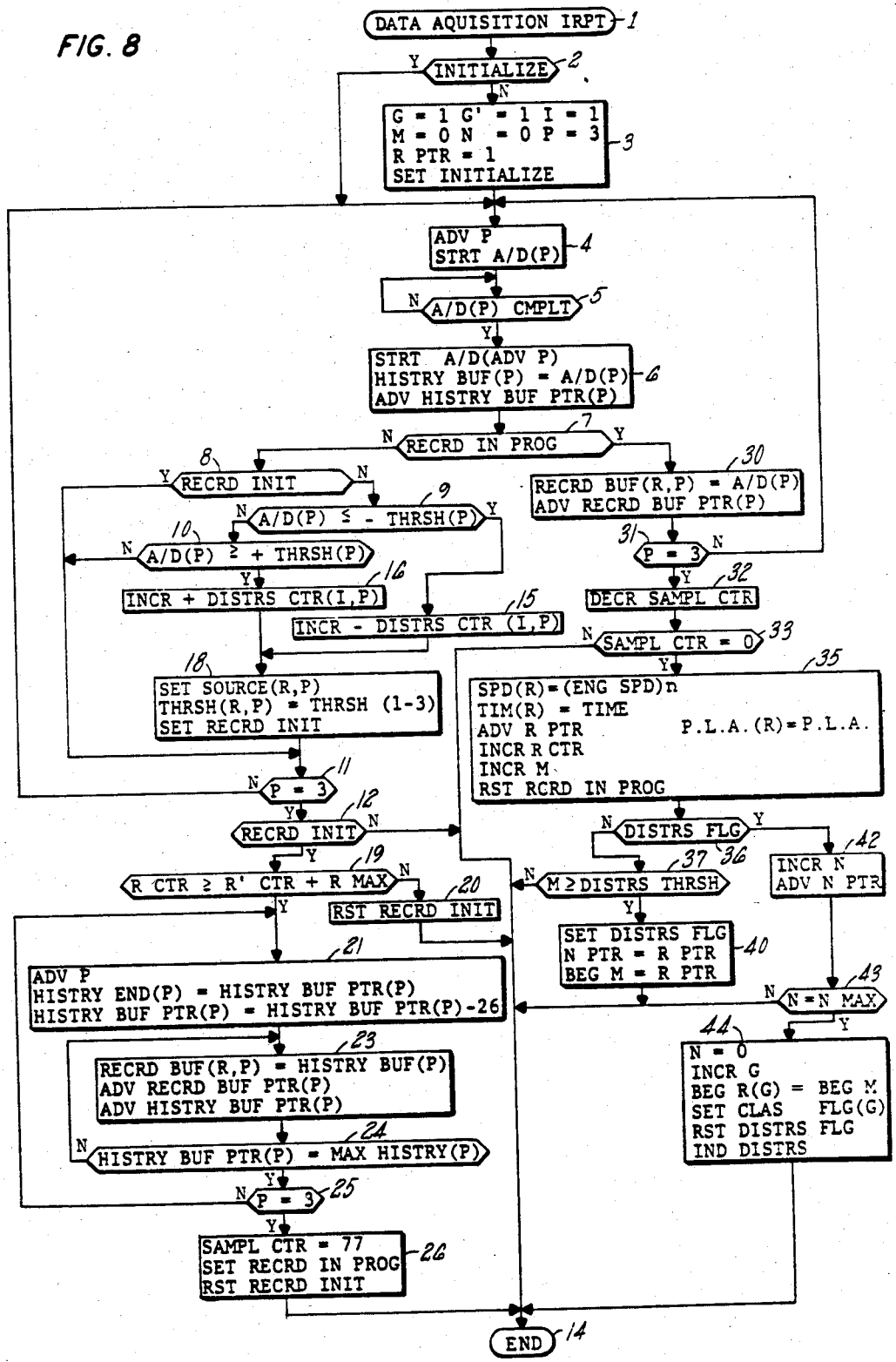
Figure 9:
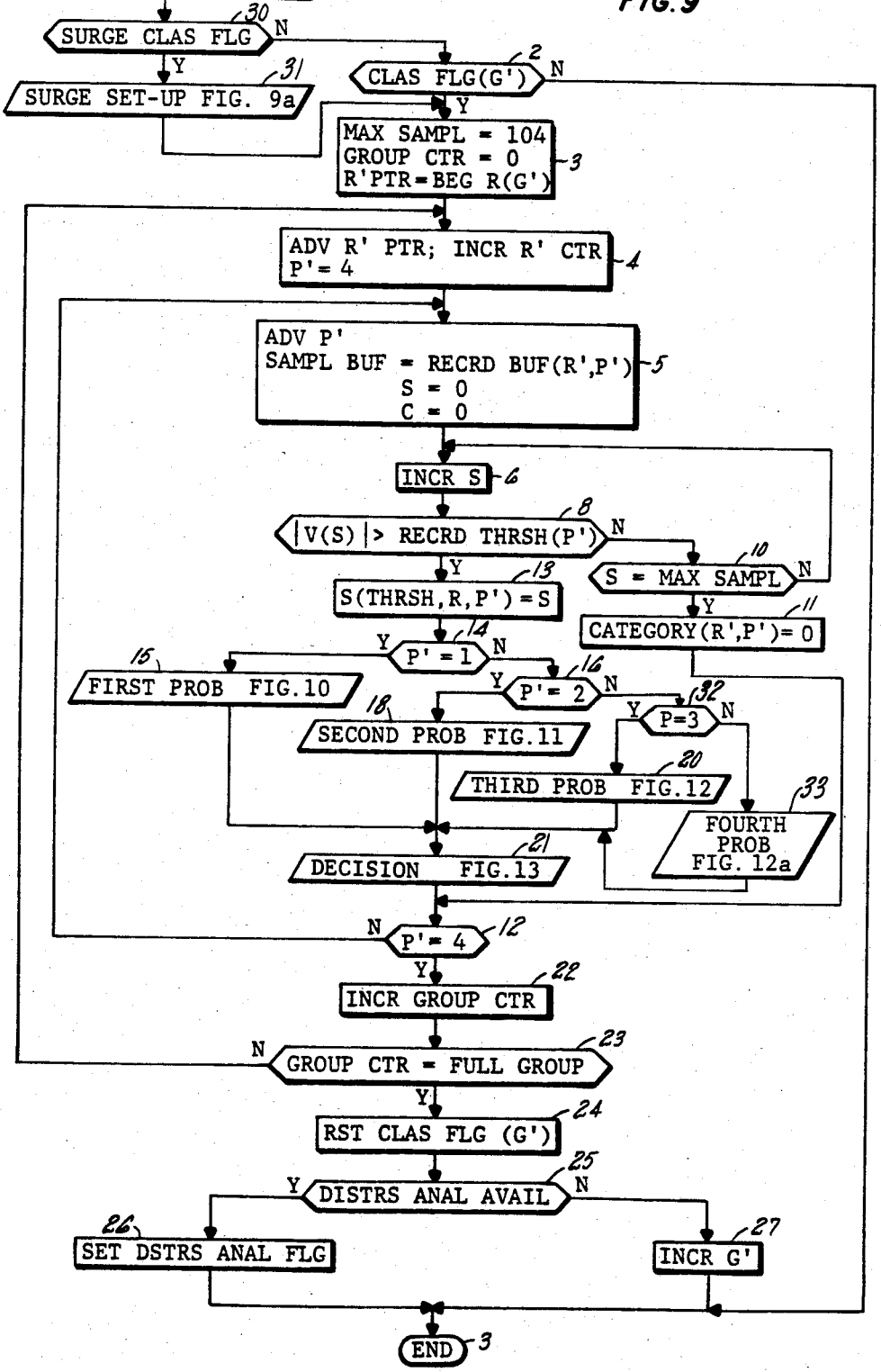
Figure 10:
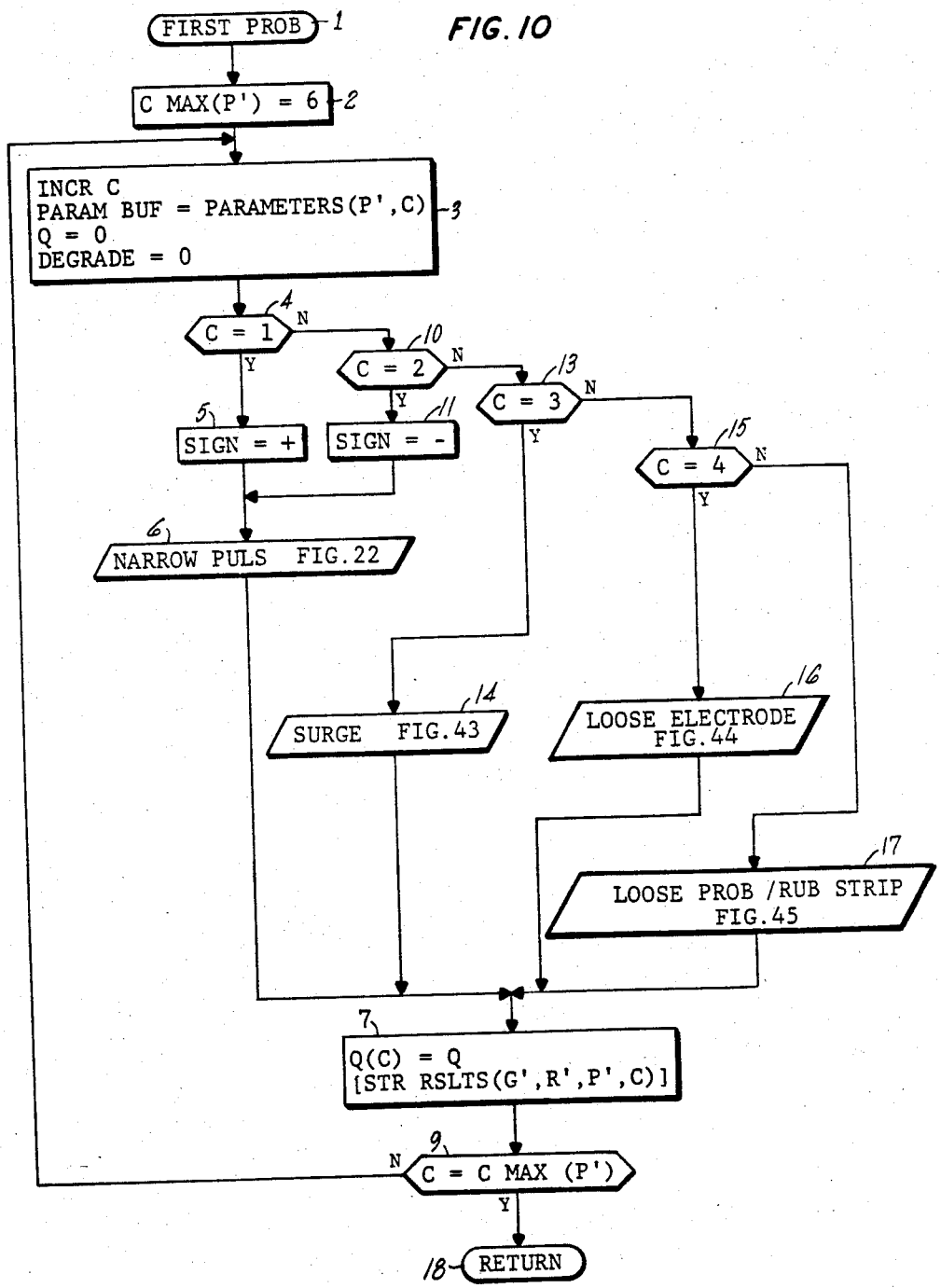
Figure 11:
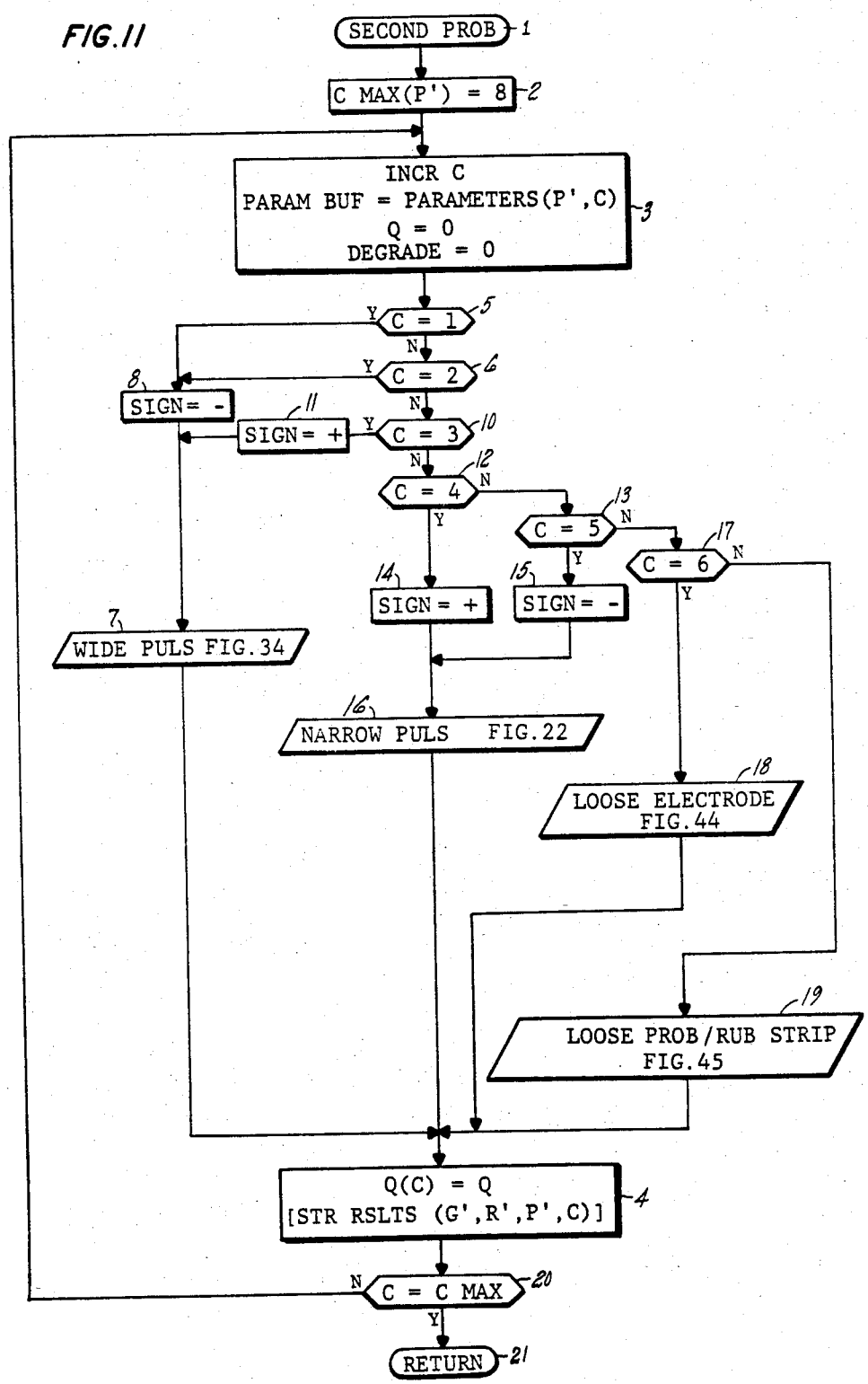
Figure 12:
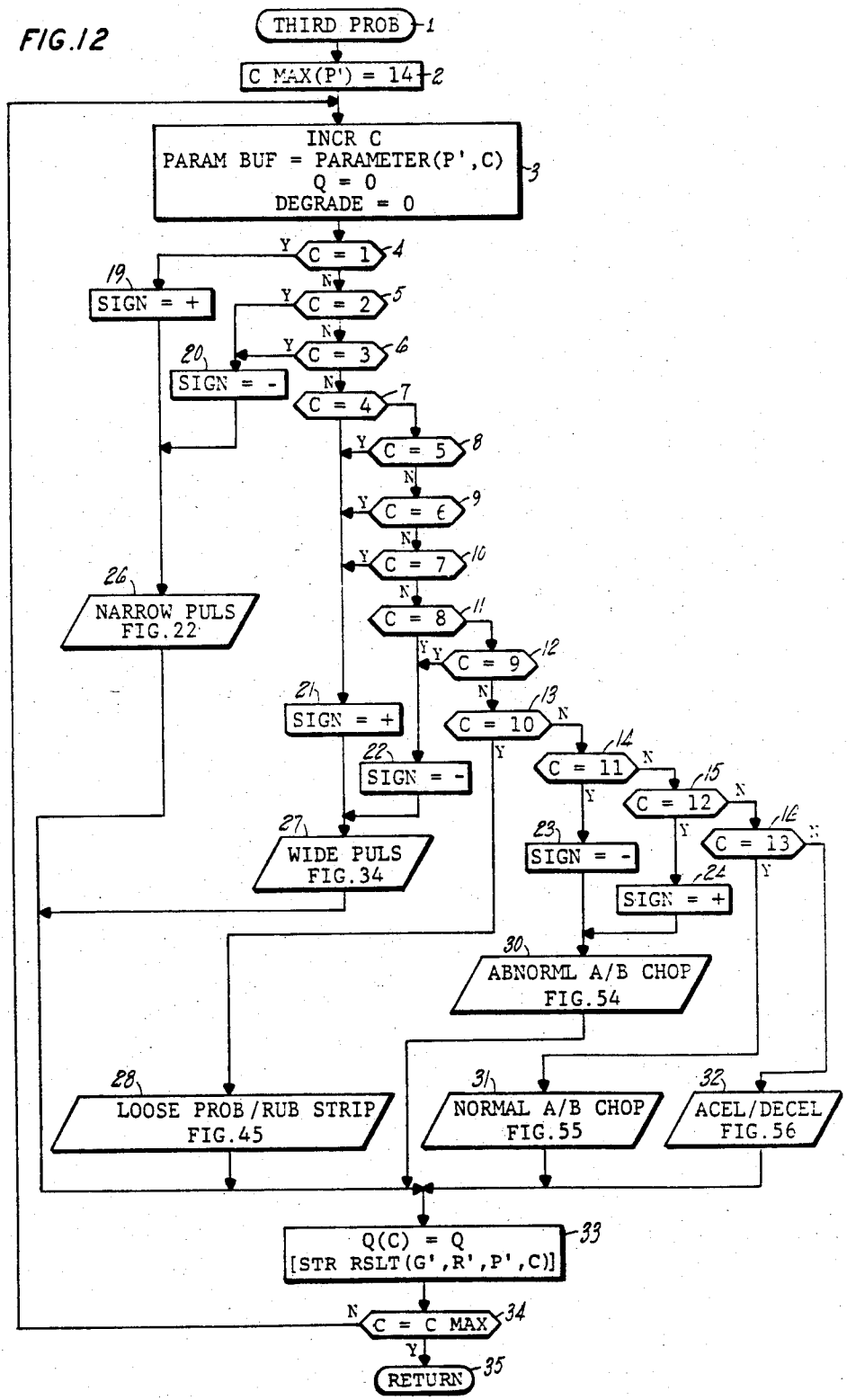
Figure 12A:
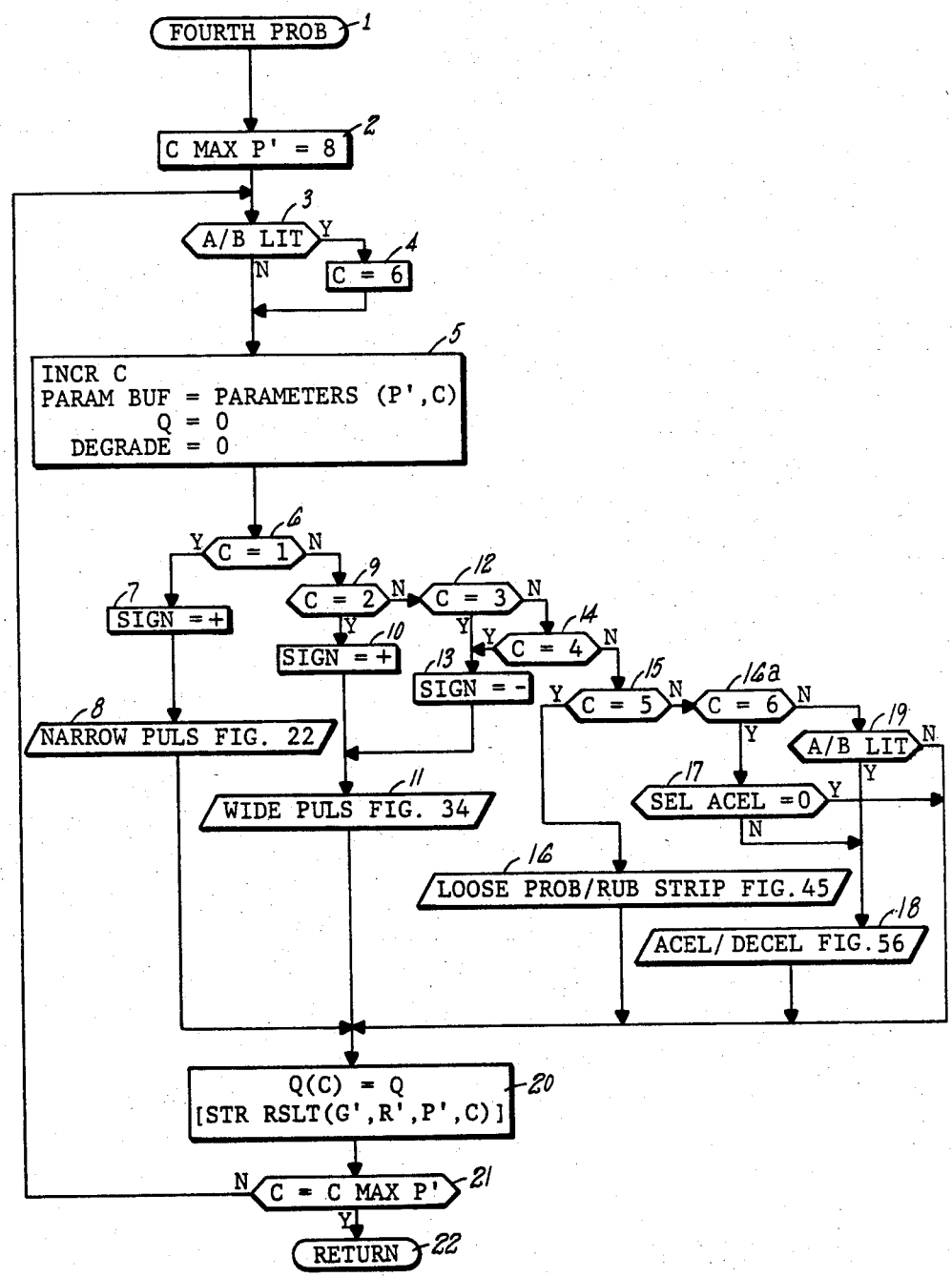
Figure 14:
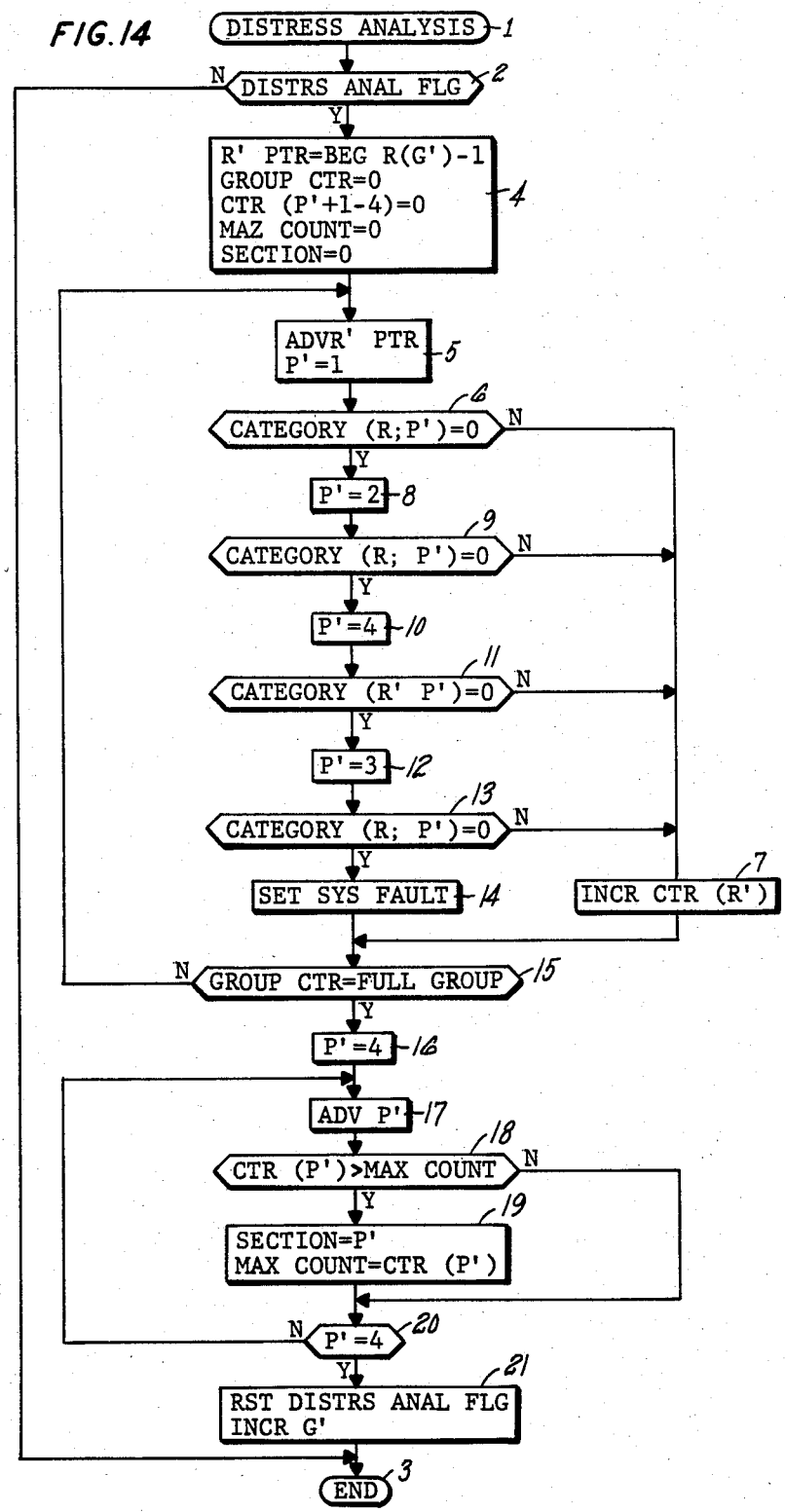
Figure 15:
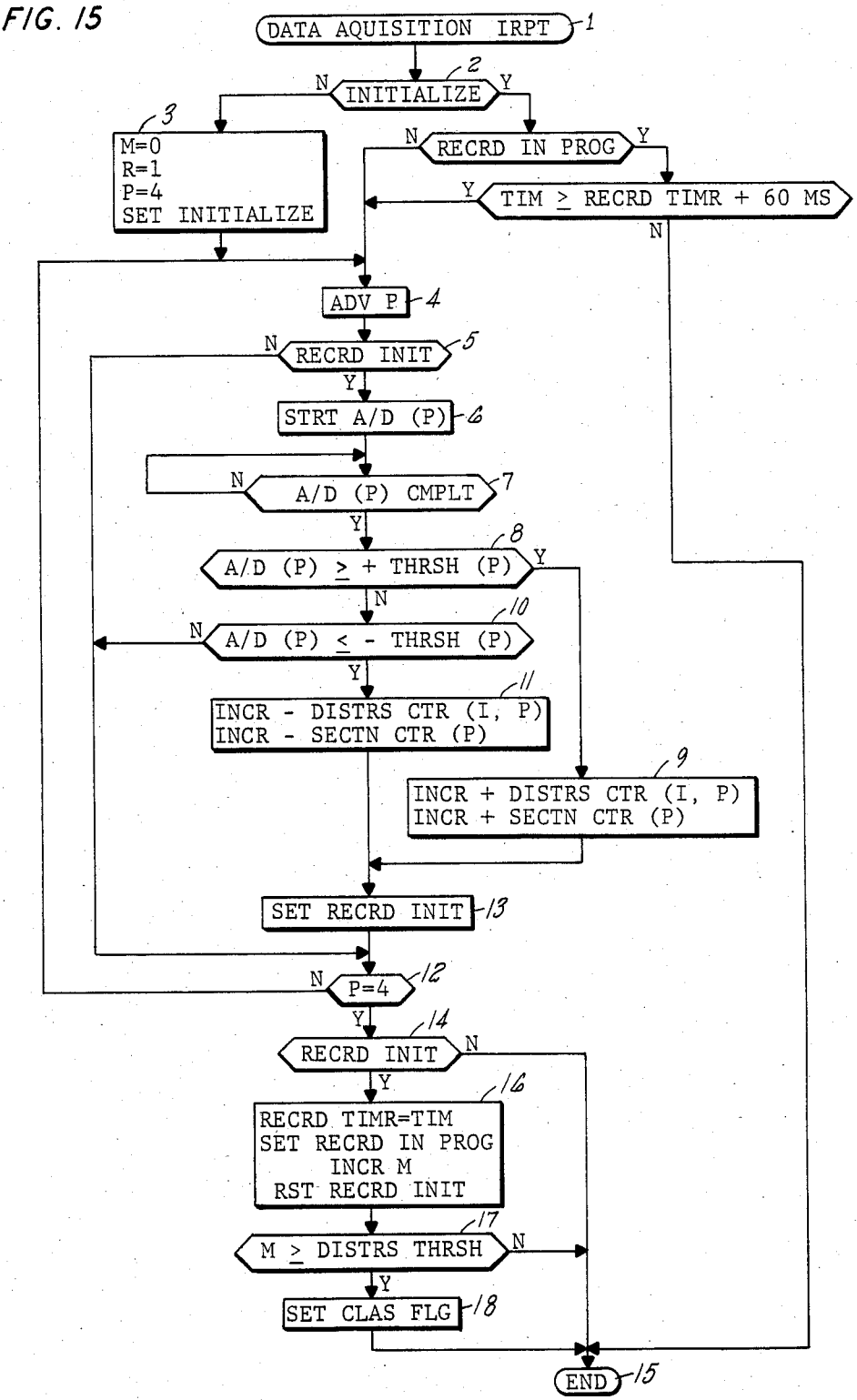
Figure 16:
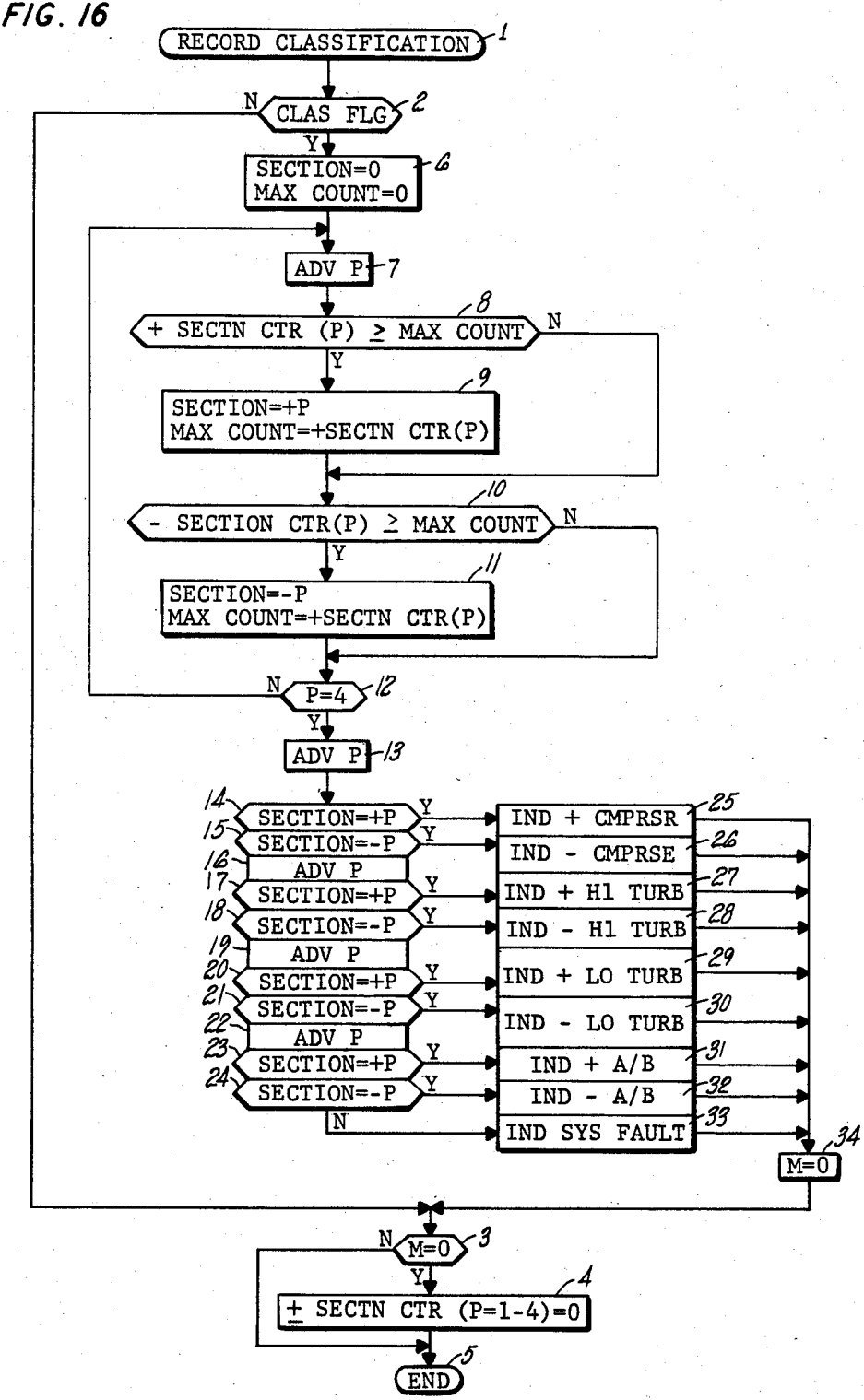
Figure 17:
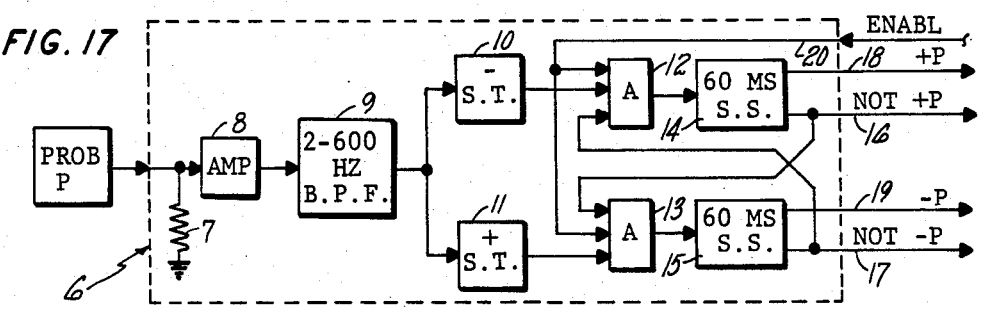
Figure 18:
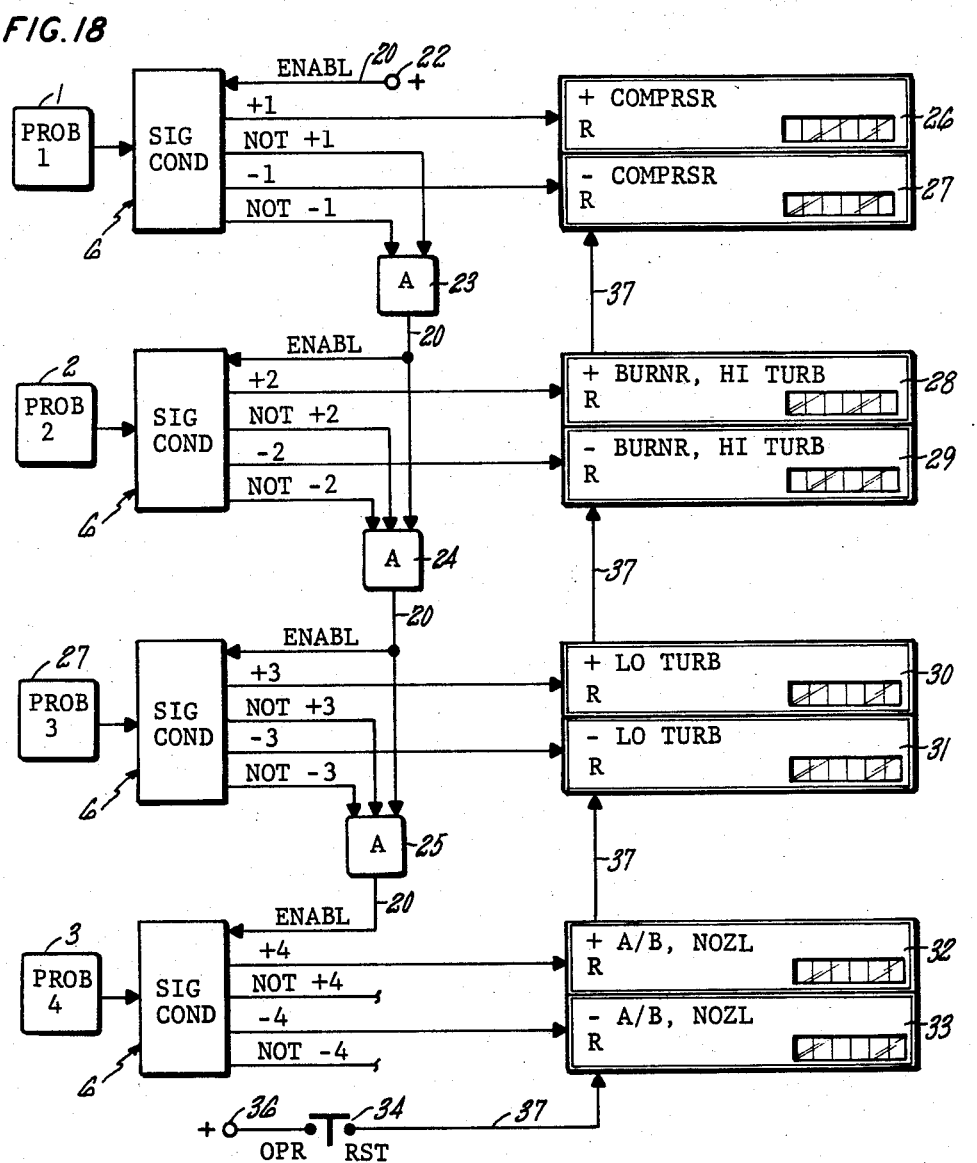

The following are logic flow diagrams of exemplary computer program routines:

FIG. 3—engine speed request interrupt;

FIG. 4—engine speed ready interrupt;

FIG. 5 and FIG. 6 are illustrative diagrams of data acquisition and data storage;

The following are logic flow diagrams of exemplary computer program routines:

FIG. 7—noise interrupt;

FIG. 8—data acquisition interrupt of prior art;

FIG. 9—record classification;

FIG. 10—first probe;

FIG. 11—second probe;

FIG. 12—third probe;

FIG. 12a—fourth probe;

FIG. 13—decision;

FIG. 14—distress analysis;

FIG. 15—data acquisition—second embodiment;

FIG. 16—record classification—second embodiment;

FIG. 17 is a simplified schematic block diagram of exemplary signal conditioning apparatus utilized in an analog embodiment of the present invention with respect to a plurality of probes, as illustrated in FIG. 17;

FIG. 18 is a simplified, schematic block diagram of a plurality of probes utilizing the signal conditioning circuitry of FIG. 17, to provide plus and minus counts of signal threshold crossings encounters corresponding to related sections of a gas turbine engine;

FIGS. 19–56 are disclosed in the aforementioned Zwicke et al. application;

The following are diagrams of exemplary waveshapes resulting from electrostatic activity in the gas path of the engine, which are discriminated in this embodiment with the probe (P) and category (C) numbers:

FIG. 57—compressor metal/abradable rub (P 1, C 1); FIG. 58—compressor metal/metal rub (P 1, C 2); FIG. 59—surge (P 1, C 3); FIG. 60—loose probe electrode (P 1, C 1; P 2, C 6); FIG. 61—loose probe connector (P 1, C 5; P 2, C 7); FIG. 62—rub strip (P 1, C 6; P 2, C 8; P 3, C 10); FIG. 63—first high turbine blade erosion (P 2, C 1); FIG. 64—first high turbine vane erosion (P 2, C 2); FIG. 65—first high turbine rub (P 2, C 3); FIG. 66—second high turbine rub (P 2, C 4); FIG. 67—second high turbine blade or vane erosion (P 2, C 5); FIG. 68—flaming debris (P 3, C 1); FIG. 69—A/B nozzle liner erosion (P 3, C 2); FIG. 70—uncorrelated—1 (P 3, C 3); FIG. 71—uncorrelated—2 (P 3, C 4); FIG. 72—high turbine rub (P 3, C 5); FIG. 73—low turbine rub (P 3, C 6); FIG. 74—high or low turbine impact-induced rub (P 3, C 7); FIG. 75—high turbine blade erosion (P 3, C 8); FIG. 76—high turbine vane erosion (P 3, C 9); FIG. 77—start of abnormal A/B chop (P 3, C 11); FIG. 78—end of abnormal A/B chop (P 3, C 12); FIG. 79—normal A/B chop (P 3, C 13); and FIG. 80—acel/decel (P 3, C 14).

BEST MODE FOR CARRYING OUT THE INVENTION

DIAGNOSTIC SYSTEM—FIG. 1

Figure 1:
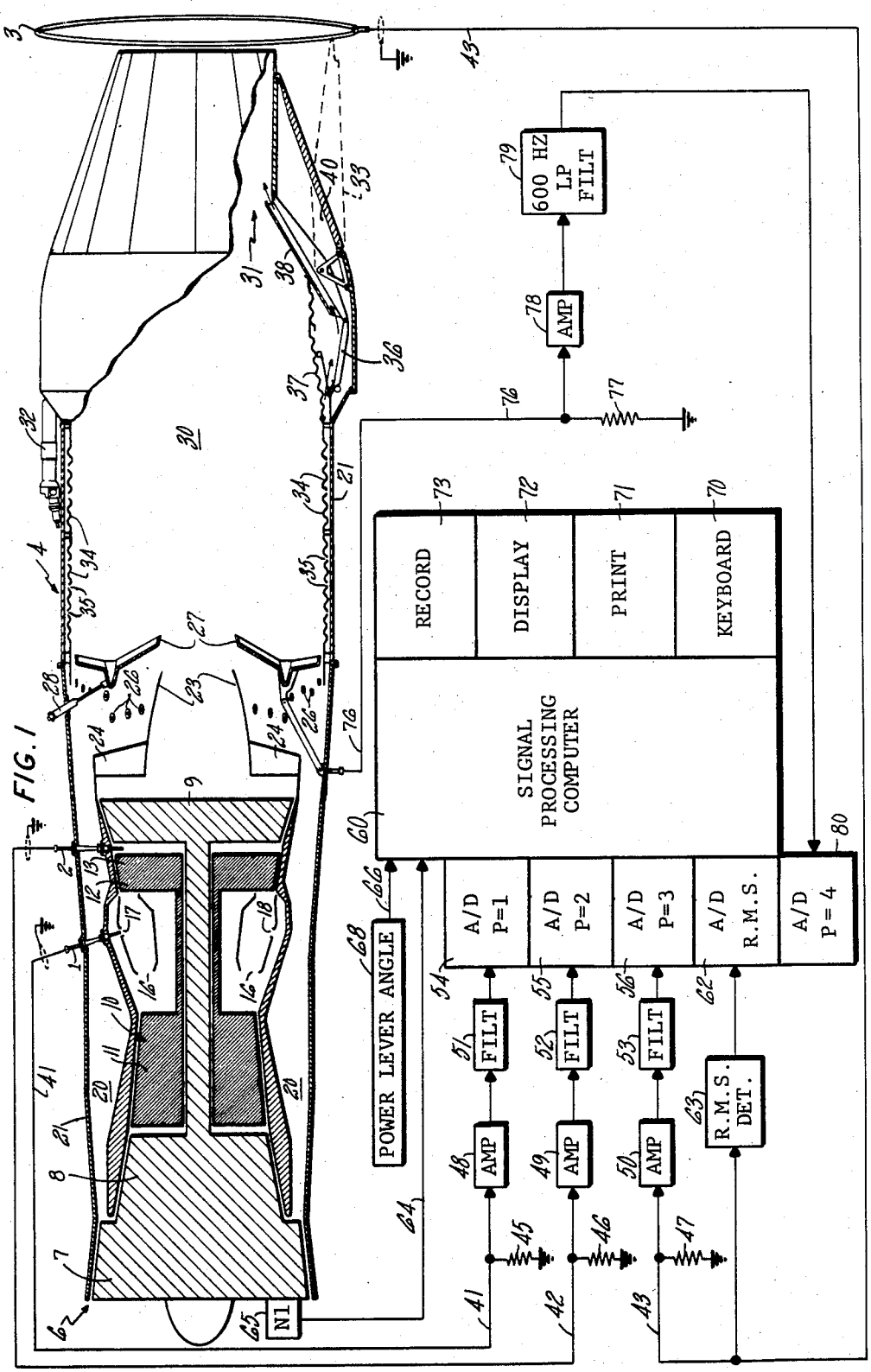
FIG. 1 is a simplified, sectioned side elevation view of an afterburning gas turbine engine together with a simplified schematic block diagram of electrostatic engine diagnostic apparatus attached thereto, in which the present invention may be implemented.

Referring to FIG. 1, a plurality of probes 1, 2, 3 are disposed for response to electrostatic charge in the gas stream of an afterburning gas turbine engine 4. The engine 4 is shown in an simplified fashion for illustrative purposes only; the invention may be utilized as well with engines which do not have an afterburner, or engines with slightly different characteristics than those implied by the description herein. As shown, the engine 4 has a low pressure spool 6 including a fan 7, a low pressure compressor 8, and a low pressure turbine 9. A high pressure spool 10 includes a high pressure compressor 11 and a high pressure turbine including first blades 12 and second blades 13 (downstream of and separated from the first blades 12 by vanes, not shown). The probe 2 is inserted at the vanes between the high pressure turbine blades 13 and the low pressure turbine 9. The engine includes an annular burner can 16 having dilution air inlet holes 17, 18 therein, the probe 1 being inserted with its tip in the dilution air inlet hole 17. The core engine 6–17 is surrounded by an annular fan duct 20, the outer wall of which is the engine wall 21. An exhaust cone 23 is supported by suitable struts 24. A plurality of spray rings 26 (shown only schematically herein) provide fuel mist to the afterburner of the engine, the essential part of which is a flameholder 27 coupled with an igniter 28. The tail pipe of the engine 30 includes a variable nozzle 31 which is shown in the closed position herein, but which when moved by actuators, illustrated by an actuator 32, can assume the position shown by the dotted lines 33. The tail pipe 30 has an afterburner liner 34 with a plurality of cooling air outflow holes 35 therein; fan air enters between the liner 34 and the engine wall 21 in the vicinity of the flameholder 27 to cool the engine wall and avoid burnthrough. One of the tests herein is determining erosion of the nozzle liner 34. The cooling air continues to flow aft between a balance flap 36 and a movable nozzle liner extension called a balance flap seal 37 which makes rubbing contact with a balance flap link 38 under which the air flows. Several tests described hereinafter are related to rubbing of the seal 37 which precedes a burnthrough thereof that allows the hot afterburner gases to proceed from the tail pipe 30 into the spaces 40 beneath the plate 39, causing nozzle damage.

Each of the probes 1-3 is connected by a suitable conductor 41-43, which may preferably be coaxial cable with grounded sheaths, to respective terminating impedances 45-47 which may be on the order of 100 kilohms, although the impedance 47 related to the probe 3 may be somewhat smaller, in some cases, in dependence upon the particular manner in which the present invention is utilized. As electrostatic charge passes by any of the probes 1-3, depending upon the polarity of the charge, current flows into and out of the probe, causing corresponding voltages across the impedances 45-47. The voltage developed across the impedances 45-47 are fed to corresponding amplifiers 48-50, the outputs of which are fed to corresponding filters 51-53 to have the high frequency, high voltage Trichel pulses, and other noise signals eliminated. The filters preferably are band-pass filters having an upper cut-off frequency on the order of about 600 Hz, although cut-off in the range of 400 to 1,000 Hz are suitable. The filters may have a lower cut-off frequency of 1-5 Hz, to eliminate some drift and other D.C. phenomenon in the waveshapes being examined. In fact, the exemplary waveshapes described herein and illustrated by the exemplars of FIGS. 57-80 were achieved utilizing band-pass filters having a sharp cut-off at 490 Hz.

Each of the filters 51-53 feeds a corresponding analog-to-digital (A/D) converter 54-56 connected with a signal processing computer 60. As described more fully hereinafter, the A/D converters are operated to sample the filter outputs (the probe signals) once about every millisecond, the A/D converters being read in rapid succession, within about 10 microseconds of each other. However, the exemplary waveforms illustrated in FIGS. 57-80 herein were obtained by sampling at a 1.3 KHz rate. There are 26 historical samples prior to the sample which crosses a threshold (as described hereinafter) in a 20 millisecond history period and 77 additional samples across a 60 millesecond post threshold crossing interval, totaling 104 samples in an 80 millisecond record which each of the waveshapes of FIGS. 57-80 comprise.

For pockets of sufficient charge to be of interest, current in the probe 1 may be on the order of 0.10 microamperes; current in the probe 2 may be on the order of 0.20 microamperes; and current in the probe 3 may be on the order of 2.5 microamperes. Within impedances of about 100 kilohms, the gain of amplifiers 48 and 49 may be about 100, and the gain of amplifier 50 may be about 10. This results in signals of interest of between one and ten volts, with an occasional higher signal. The D/A converters need only respond to 10 volts, any saturation from higher voltages being unimportant. With the aforementioned gains, thresholds (described with respect to FIG. 8, hereinafter) may be 1 volt for probe 1, 2 volts for probe 2 and 2½ volts for probe 3, if fixed thresholds are used. This, of course, will vary depending on how the invention is utilized. If desired, the impedances and voltage scaling can be changed to suit different A/D converters. The signal processing computer 60 may also have an R.M.S. A/D 62, the input of which is a conventional R.M.S. detector 63 which is connected to the probe 3 because probe 3 has no contact with the engine exhaust, and therefore has no D.C. component and very low noise, as described in the aforementioned Couch application, Ser. No. 432,507, filed 10-4-82, now U.S. Pat. No. 4,584,531. The R.M.S. detector preferably includes, or is fed by, an isolation amplifier (not shown). As described hereinafter, R.M.S. noise is utilized in the present embodiment as an indicator of a normal wear interval. The signal processing computer 60 may also have an engine speed input on a line 64 provided by a tachometer 65 responsive to the low pressure spool 6 (N1). In the present embodiment, the engine speed signal is used to provide an acceleration variation of threshold. The signal processing computer 60 may also be provided with a signal on a line 66 provided by a power lever angle transducer 68. In the present embodiment, this simply provides historical information to accompany the data which is otherwise acquired and analyzed. The signal processing computer 60 may have conventional input/output devices attached thereto in order to derive the useful information provided thereby: these may include a keyboard 70, a printer 71, a display unit 72 and a recording device 73, such as a magnetic floppy disc or a magnetic tape cassette, or the like, as desired. If the invention is utilized in an airborne environment (necessitating use of a different probe than the hoop probe 3), the conventional input/output devices 70-73 would not be used; instead, a nonvolatile storage module would be used to collect data in the air, the content of which would be displayed and analyzed in ground-base signal processing apparatus.

The description thus far is of a three probe system as set forth in the aforementioned Zwicke et al application, Ser. No. 454,124. In the present embodiment, a fourth probe is provided. In this embodiment, the flameholder 27 is insulated and comprises a fourth probe (designated as P=4, herein), of the type described in a commonly owned, copending U.S. patent application entitled "Afterburner Flameholder Ion Probe", Ser. No. 454,116, filed contemporaneously herewith by Couch now U.S. Pat. No. 4,510,794. The flameholder probe 27 is connected by a suitable conductor 76, similar to the conductors 41-43, to a terminating impedance 77, similar to the impedances 45-47, the voltage developed across the impedance 77 being fed to an amplifier 78, similar to the amplifiers 48-50, the output of which is fed to a filter 79, similar to the filters 51-53. The filter 79 feeds an A/D converter 80, similar to the A/D converters 54-56.

Some of the description which follows hereinafter, particularly with respect to FIGS. 5 and 6, is given in terms of a three probe system; however, the extension thereof to four probes should be understood by those skilled in the art in the light of the teachings which follow hereinafter.

According to the present invention, an afterburner light-off discrete (A/B LIT) may be derived from the flameholder probe, although the The signal processing computer 60 may be selected from a wide variety of commercially available signal processors. Such computers may be as small as an Intel 8080, or may be larger, such as the Texas Instruments 9900 series. Or, in dependence upon the speed and amount of information which is desired to be retained during any given operation, a mini-computer such as a Digital Equipment Corp. PDP/11 may be used. Of course, any larger computer may be used if desired. Or, two microprocessor C.P.U.s may be used: one for data acquisition and one for date waveform classification and/or analysis. The particular nature of the particular computer used, the input/output equipment disposed thereon, sampling rates and other things can be varied to suit any implementation of the present invention, utilizing readily available hardware and suitable common programming techniques, which are well within the skill of the art in the light of the teachings which follow hereinafter.

In the description which follows hereinafter, it should be understood that various features set forth and claimed in other commonly owned, copending U.S. patent applications are disclosed. These are disclosed herein for simplicity in illustrating the best mode of the present invention, which may be utilized in conjunction with such other features and for simplicity in presenting the manner in which the other features may be incorporated herewith. However, the present invention relates to the discrimination by waveshape of electrical signals produced by electrostatic effects in the engine gas stream, and which correlate in major part with known events or conditions of the engine.

Abbreviations, some or all of which are used herein, are set forth in Table I.

TABLE I

| | |
|---|---|
| A/B = afterburner | MEASRD = measured |
| ABNORML = abnormal | MIN = minimum |
| ABSNT = absent | MULT = multiple |
| ACEL = acceleration | NEG = negative |
| A/D = analog-to-digital | NOMNL = nominal |
| ADV = advance | OPOS = opposite |
| BEG = beginning | P = PROB = probe |
| BUF = buffer | PARAM = parameter |
| C = CAT = category | PK = peak |
| CLAS = classification | P.L.A. = power lever angle |
| CONECTR = connector | POST = post-pulse |
| CROS = CROSNGS = crossings | PRE = pre-pulse |
| CTR = counter | PRIM = primary |
| DECEL = deceleration | PROG = progress |
| DECR = decrement | PTR = pointer |
| DGRD = degrade | PULS = pulse |
| DGRDN = degradation | Q = quality factor |
| DIF = difference | R = RCRD = record |
| DISTRS = distress | RDY = ready |
| DVSR = divisor | REQ = request |
| ENBL = enable | REVRS = reverse |
| ENG = engine | R.M.S. = root-mean-squared |
| EXP = exponent | RSLTS = results |
| FLG = flag | RST = reset |
| FOLWNG = following | S = SAMPL = sample |
| FXD = fixed | SENSTVTY = sensivity |
| G = group | SEPRATN = separation |
| HI = high | SIN = sign |
| HISTRY = history | SPD = speed |
| INCR = increment | SQRT = square root |
| INIT = initialize | STR = store |
| INTGRL = integral | STRT = start |
| INTVL = interval | TACH = tachometer |
| IRPT = interrupt | THRSH = threshold |
| LIM = limit | V = value, volts |
| LO = low | VARIATN = variation |
| MAX = maximum | ( ) = of; or grouping |

PROGRAM STRUCTURE—FIG. 2

Figure 2:
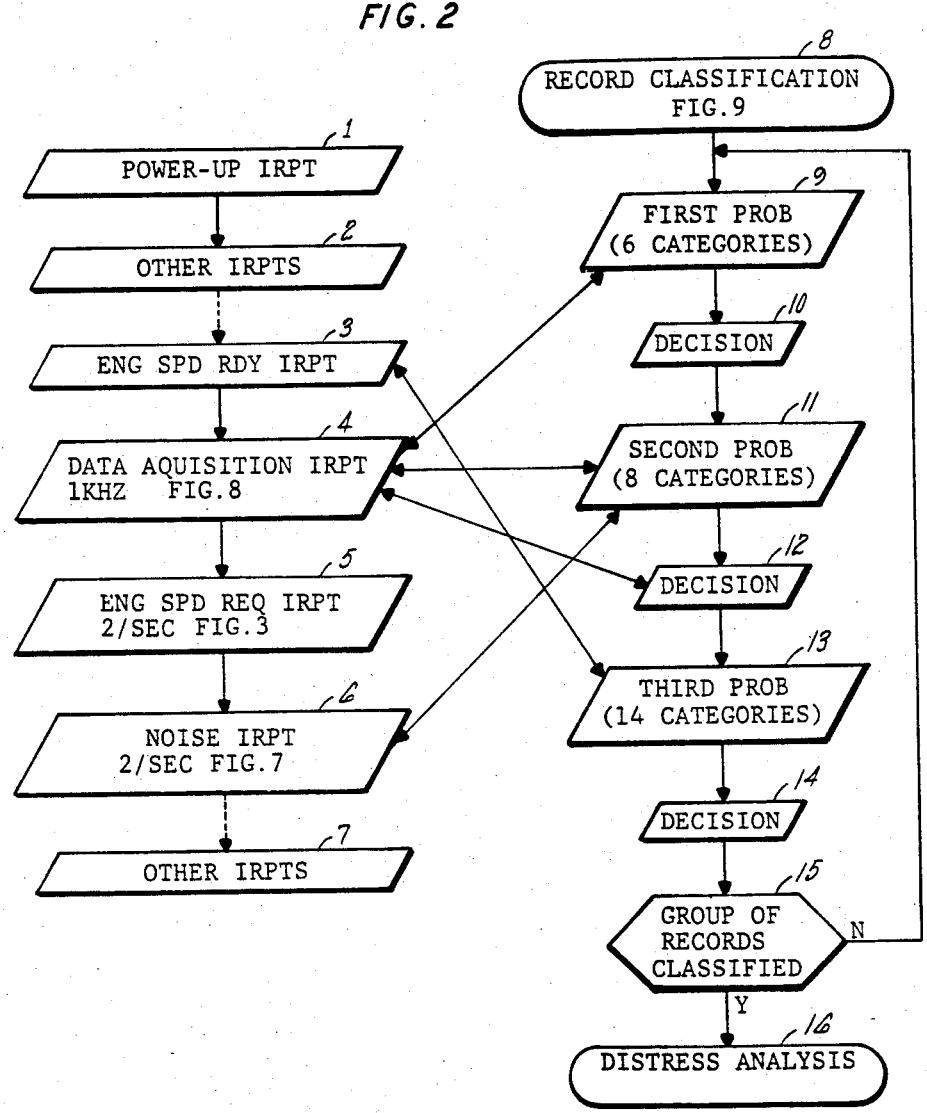
FIG. 2 is a simplified, logic flow diagram of a program structure which may be utilized in programming a suitable data processing system for implementing the present invention.

Referring now to FIG. 2, a simplified illustration of an exemplary program structure for acquiring and classifying data provided from the probes 1-3 disposed for response to the engine includes utilization of interrupts to acquire data and utilization of background programs (which may be interrupted for data acquisition) for classifying, analyzing, and correlating the data. The program structure is exemplary merely, and other structures may be utilized in dependence upon the size and type of data processing system used to implement the present invention. Typically, systems are initialized on power-up by a power-up interrupt routine 1 which is automatically reached by the highest ordered interrupt in an interrupt priority scheme. Other interrupts 2 may be utilized, such as for sending and receiving data to auxiliary storage devices (such as cassettes and floppy discs) or sending data to a printer. Then a medium priority interrupt 3 may reach an engine speed ready interrupt program to read engine speed, as described more fully hereinafter with respect to FIG. 4. A next higher order interrupt 4 may reach a data acquisition interrupt program for actually reading the data from the probes disposed with the engine, as is described more fully hereinafter with respect to FIG. 8. And an interrupt 5 of a relatively lower priority may reach an engine speed request interrupt program, for initiating the reading of engine speed, as described with respect to FIG. 3 hereinafter. A relatively still lower priority interrupt 6 may reach a noise interrupt program for reading R.M.S. noise on one of the probes, as is described more fully hereinafter with respect to FIG. 7. Then, other interrupts 7 of still lower ordered priority may be utilized such as to control tape transport real time delays and to handle display and keyboard character exchange. All such other interrupts are those which will suit any given implementation of the invention, in dependence upon the particular system in which the invention is embodied and the design requirements thereof.

In FIG. 2, as an example only, a record classification program, described in detail with respect to FIG. 9, is called on a regular basis, and is actually performed whenever records have been accumulated to be classified and the classification has not yet been done (as described hereinafter). Briefly illustrated is the basic units of the record classification program of FIG. 9. For instance, the record classification program 8 includes a first probe subroutine 9 which compares a sample record with five categories of signals, following which a decision subroutine 10 determines which of the five categories (if any) is likely to have been the one which occurred in the engine. Then a second probe subroutine 11 examines a record against the characteristics of seven categories and a decision subroutine 12 determines which of the seven categories is likely to have occurred in the engine. A third probe subroutine 13 examines the records from the third probe against characteristics of fourteen different categories and a decision subroutine 14 determines which of the fourteen categories (if any) is likely to have occurred in the engine. The process set forth illustratively with respect to the subroutines 9-14 is repeated until an indication 15 is provided that an entire group of records has been classified. Then, a distress analysis program 16 may be called to provide further, post-classification processing in a manner described more fully hereinafter with respect to FIG. 9 hereinafter. Thus, as record classification and distress analysis are being performed, acquisition of probe data, engine speed and noise continues by means of interruption of the record classification and distress analysis programs.

ENGINE SPEED—FIG. 3., FIG. 4

Referring now to FIG. 3, an engine speed request interrupt is issued on a real time basis, such as twice per second. This reaches an engine speed request interrupt program through an entry point 1 in FIG. 3. A pair of steps 2 cause an engine speed counter to be reset to all zeros and a tachometer I/O request to be issued. Then, a test 3 determines when the tachometer I/O has acknowledged the request with a handshake, and when it does, an affirmative result of test 3 reaches a pair of steps 4 in which a speed timer is started and the engine speed ready interrupt is enabled (if required). Then the program ends at point 5 and the program which was interrupted (if any) is resumed through ordinary, interrupt handling processes. When the speed timer started in steps 4 of FIG. 3 reaches a predetermined count (across which tachometer pulses are counted by the engine speed counter which was reset in steps 2), the speed timer will then issue an engine speed ready interrupt.

In FIG. 4, the engine speed ready interrupt reaches an engine speed ready interrupt program through an entry point 1. In a series of steps 2, the engine speed information is processed so as to provide a voltage threshold for one of the probes (such as the third probe in the present embodiment) which includes a component related to engine speed. In the steps 2, new engine speed (designated by "n") is set equal to the engine speed counter. The faster the engine was going, the higher the count. Then engine acceleration is determined by subtracting the old engine speed (designated by "m") from new engine speed. Then the threshold for the third probe is provided by multiplying the absolute value of engine acceleration (so as to be positive during either acceleration or deceleration) by some constant, and adding it to a fixed threshold value which is otherwise appropriate for that probe. Then the old engine speed is updated by making it equal to the new engine speed. Engine speed (or the preceding sequence of speeds) can also be recorded as one of the parameters in a record indicative of an event in the engine, as described hereinafter. This poses no problem since the new value of engine speed can be reached in a steady condition (not changing from old value to new value) at all times other than during the engine speed ready interrupt. When the steps 2 have been performed, the program is ended through an exit point 3. Then, any program which was interrupted by the engine speed ready interrupt is reverted to through ordinary interrupt handling processes. Engine speed may alternatively be derived using automatic hardware apparatus, rather than a clocked interrupt.

ILLUSTRATION OF DATA ACQUISITION—FIG. 5, FIG. 6

The manner in which the data acquisition interrupt 4 of FIG. 2 acquires samples from the probes is illustrated briefly at the bottom of FIG. 5. In FIG. 5, each of the probe A/Ds is interrogated once about every millisecond. During acquisitions of the data, the A/Ds for the successive probes are read in the order: probe 1, probe 2, probe 3. These are read as quickly as they can be (as closely as possible together) so that the data samples (1-104 in the present embodiment example) will relate very closely to the same time frame and therefore have correlative meaning. A sample rate on the order of 1000/second (1 millisecond between samples) has been found to be acceptable. This leaves approximately 750 milliseconds for processing (such as record classification and the like) as described with respect to FIG. 2 hereinbefore, between the sampling of triplets of data from the probes. As each probe is sampled, the digital value indicative of the magnitude of signal on the probe (illustration (f), FIG. 6) is stored in a corresponding, successive location in a portion of storage referred to herein as a history buffer (illustration (e), FIG. 6). The history buffer may have the capacity to hold 32 or 256 (or some other number of) triplets of data as illustrated in the bottom of FIG. 6. Therein, the data samples for probes 1-3 are indicated as having been stored in positions of the history buffer arbitrarily identified as numbers 31 through 62. The reading of data from the A/Ds into the history buffer goes on continuously, without regard to whether or not thresholds have been exceeded. When the history buffer is full, the corresponding history buffer pointers (one for each probe) simply cycle around to the lowest address thereof and continue to overwrite data in a cyclic manner. This data is of no significance except in the event that the value sensed on one of the probes exceeds the threshold for that probe; a threshold exceedance at any one of the probes causes the last 27 samples for all of the probes to be moved from the history buffer (illustration (e) of FIG. 6) into the record buffer (illustration (d) of FIG. 6). The record buffer is shown in an expanded format, and illustrates that 104 samples and other data relating to each probe, as well as additional data such as speed, power level angle and time, may be stored in each record which results from each threshold exceedance by any one of the three probes. The sample value number (1-29...104) thus becomes known only once a threshold is exceeded by the data sensed on one of the probes. The bottom portion of illustration (d) of the record buffer shows an exemplary complete record, identified as record number 61 in the middle portion of illustration (d) in FIG. 6. Capturing a complete record, whenever an event occurs in the engine as sensed on any one of the three probes, does not necessarily result in utilization of any of that data. This is because events occur occasionally even in a healthy engine, so analysis of the particular event is not necessarily an indication of abnormal engine wear. Instead, abnormal wear is indicated by the occurrence of some large number of threshold exceedances (such as ten times a normal number) within a given wear interval of time (which may be a fixed or variable interval of time). In the present embodiment, the wear interval is variable and is dependent upon the average value of R.M.S. noise on one of the probes at times other than when an event is occurring, as is described more fully with respect to FIG. 7 hereinafter. In the present embodiment, "M" is determined to be ten times the normal number of threshold exceedances which should occur during a wear interval in a healthy engine. This number may be, for instance, on the order of 20 or so. The value "N" is taken to be some arbitrary number of additional records, following the occurrence of ten times normal wear, which may be taken so as to complete a classification group of records to provide an indication of what sort of abnormal wear has occurred. In the present embodiment, N may be on the order of ten or so. As shown in the middle of illustration (d) of FIG. 6, a group of records is composed of M+N records numbered 60 through 90 totaling thirty records and comprising group 2. Groups 1-4 of the record buffer are shown in the upper portion of illustration (d). These groups of records are stored away in a fairly substantial record buffer which may contain on the order of 64 or 256 records. Depending upon the particular manner in which the present invention is utilized, records may be accumulated until the record buffer is full, after which no more records are taken. Or, the record buffer may be operated in a cyclic fashion (as described with respect to the history buffer hereinbefore) so when the maximum address for the highest group of records is reached, the pointers (R, R') which keep track of the record buffer revert to zero and begin to walk through the record buffer a second time. In the present embodiment, a cyclic record buffer of a suitable size is presumed to be desirable and provisions are made to prevent records from being overwritten until the data content thereof has been analyzed. In such a case, the results of analysis for any particular group of records may be stored in a group results portion of storage as shown in illustration (a) of FIG. 6. The amount of storage required to store the overall processed results for each group is extremely small compared to all of the sample records in each of the groups, and therefore a significantly large number of group results can be stored with relatively small amount of storage. In other embodiments, the classification may be done either off-line or in separate equipment (such as when data is collected by an airborne data acquisition unit and processed in a ground based classification unit). In such a case, the record buffer is preferably comprised of a nonvolatile storage, and when the record buffer is full with some reasonable number of groups of records, acquiring of further records ceases, as described more fully hereinafter. Other aspects of storage which are illustrated briefly in FIG. 6 are described hereinafter.

In FIG. 6, the groups 1-4 of records are shown as stored contiguously in the record buffer. However, the present embodiment retains records only in the event that M records occur within a wear interval. If a fewer number of records occur during a wear interval, this is taken to be normal wear and not worthy of being recorded. However, it cannot be known whether or not M records will occur during the wear interval until M number of records have been collected prior to completion of a wear interval.

Referring to the top of FIG. 5, four groups of M +N records are shown. The first group of records was started at some arbitrary point within the first wear interval. Since M records were accumulated before the end of the wear interval, a distress threshold (M) was exceeded and N more records were accumulated, even though some of these were accumulated in a following wear interval. At the time that M1 set of records were completed, the M counter was reset and additional records are collected in the N1 set; these records are also designated (simply by the mechanisms described hereinafter) as being applicable to the second group of records. But just after starting to collect the second group of records, the end of the first wear interval caused resetting of the M counter again so that counting of M records commenced anew (designated M2' in FIG. 5). Some of these records are the same records as are utilized in group 1 as well. Eventually M2' reaches the distress threshold and M is reset once again. The N2 set of records are collected to finish the second group of records and some of these records are designated for the third group as well (M3 in FIG. 5). But before a distress threshold is reached for the third group, the end of the second wear interval occurs and resets the M counter again. Thus the taking of records for the third group of records commences anew at the begining of the third wear interval. As it were, the entire third wear interval did not have sufficient records to exceed the distress threshold in the example of FIG. 5, so the M counter is reset again at the end of the third wear interval. Beginning at the fourth wear interval, another set of M records is started for the third group (M3"). In the example of FIG. 5, apparently a large amount of activity occurs during the fourth wear interval so that M records are collected early in the interval and a fourth group is started. The third group is completed and M records for the fourth group are completed prior to the end of the fourth interval so that in fact two groups are completed mainly within the fourth wear interval.

Notice that the wear intervals are not of the same time duration: that is because in the present embodiment the wear intervals are determined by R.M.S. noise of the engine. Since the electrostatic noise effluent in an engine is very closely a linear function of engine wear, this provides a manner of indicating how much activity should occur in a given period of time to separate normal activity from abnormal wear activity.

In FIG. 5, notice that when the N sets of records to complete a group have been taken, this does not affect the allocation of some of those records to an M set for a following group. Notice also that the M counter is reset so as to start a new count at the end of each wear interval, but the records collected thereafter will be for the same group of records that has just been terminated. On the other hand, whenever a distress threshold is exceeded (that is M, number of records have been collected) not only is the M counter reset so as to start a new group, but N more records are collected for the current group. The time interval required for M or N thresholds is also variable, depending on how much activity there is in the engine. This is illustrated best in FIG. 5 by comparison of the third and fourth interval wherein much activity occurred in the fourth interval so that two records could be designated while at the same time insufficient records were created in the third interval so as to declare a record.

R.M.S. NOISE, WEAR INTERVAL–FIG. 7

Referring now to FIG. 7, the reading of R.M.S. noise from one of the probes and the provision of an R.M.S. noise wear interval (and accommodating the consequences thereof) is illustrated in an exemplary fashion. The noise interrupt 6 of FFF. 4 reaches the noise interrupt program of FIG. 7 through an entry point 1 and a first pair of tests 2, 3 determine if a record is in progress or not. If a record is in progress, it is because one of the probes has had a threshold exceedance within about 70 milliseconds of the noise interrupt. The threshold exceedance, being an abnormal event, is not indicative of ordinary R.M.S. noise currently in the engine. Therefore, a reading of R.M.S. noise is not made in the case where a record has been initiated or is still in progress as indicated by the tests 2, 3. But whenever a record is not in progress, negative results of steps 2 and 3 in FIG. 7 will reach a step 4 wherein the R.M.S. A/D 62 is started. Then a test 5 determines when the R.M.S. A/D is complete so that an R.M.S. value can be stored in a step 6. Whenever a record has been initiated or is in progress, the R.M.S. value previously stored in step 6 is not disturbed due to bypassing thereof by affirmative results of either test 2 or 3.

In FIG. 7, a step 7 provides an R.M.S. increment as the difference between the stored R.M.S. value and some R.M.S. threshold. The R.M.S. threshold is a value of electrostatic noise at the probe (e.g., the hoop, probe 3 in this embodiment) which is very low, and indicative of the normal noise level during low thrust operation of a healthy engine. The R.M.S. threshold can be chosen as being some value of R.M.S. noise which is sufficiently low that the contribution it would make (during a half-second of time) can be ignored completely in the R.M.S. interval. This makes a wear interval dependent only on excessive R.M.S. noise which therefore is more sensitive to current engine conditions. Thus if an engine has a relatively high normal noise level, the wear intervals need not necessarily be unduly short, thereby causing an excessive amount of uninteresting data to be accumulated; instead, the R.M.S. threshold for reading that particular engine can be raised, thereby providing a meaningful wear interval based on R.M.S. noise, even though R.M.S. noise (at a given power level) may vary considerably from one engine model to the next (or even from engine to engine of the same model), which is not likely. In FIG. 7, if the R.M.S. noise is greater than the threshold, an affirmative result of test 8 will reach the step 10 in which an R.M.S. integral is incremented by some constant times the R.M.S. increment. This is a typical integration function, except for the fact it is only performed if the R.M.S. noise exceeds the R.M.S. threshold.

In FIG. 7, the R.M.S. integral is compared against some basic wear interval in a step 12. The wear interval is not a unit of time, but rather a unit indicative of a variable period of time within which the engine will exert a certain amount of work (power for a period of time), in relation to the total work the engine may exert during normal engine life. The interval corresponds to a short flight or a half-hour test; ideally, it represents about three cycles of start-up, advance to maximum power, and shut down. The wear interval is described in terms of power and cycling in the aforementioned Couch article. During the variable wear interval, a given engine will have a normal amount of activity, such as the collection of two records (two events resulting in threshold exceedance), whereby the collection of ten times that number of records (such as 20) will be indicative of abnormal wear. If the R.M.S. integral has not exceeded the wear interval value therefor, a negative result of test 12 will reach the program end at a point 18. Similarly, if test 8 determines the increment to be negative, the subroutine not only bypasses step 10, but it bypasses the remaining steps since the wear interval (having not been exceeded in a prior pass through the subroutine) could not be exceeded with the unchanged integral. However, whenever the R.M.S. noise has integrated to a point where it exceeds the wear interval, an affirmative result of test 12 will reach a series of steps 13 in which the M counter is set equal to zero and an I pointer is incremented. The I pointer incremented in step 13 of FIG. 7 is utilized as an address component for distress counters in storage which are shown in illustration (b) of FIG. 6. As described more fully hereinafter, a threshold exceedance in the positive direction or in the negative direction for each of the probes connected with the engine is counted separately during each wear interval, and these counts may be saved as an indication of the temporal spectrum of wear which occurred (without regard particularly to what caused it in the general case) during the operation of the engine. Thus, in the course of forty hours of flying time, patterns of excessive wear indicated only by these counters will generally show increases in count in a sustained fashion within a period of time (e.g., tens of hours) just before severe engine distress could otherwise be noticed, such as by adverse operation, borescope inspection or the like.

In FIG. 7, a test 14 determines whether a distress flag has been set or not, described more fully hereinafter; the test 14 relates to whether or not M records have been sensed within a single wear interval, as is described with respect to the top of FIG. 5 hereinbefore. If M records have been collected during the wear interval, (such as at the end of interval 1, interval 2 and interval 4 in FIG. 5) then the first record in the next group (such as M2' in FIG. 5) will begin at the point in the record buffer where records are now being stored. Thus an affirmative result of test 14 will reach a step 16 wherein a temporary pointer (called Begin M) is set equal to the current value of an R pointer that keeps track of records being stored in the record buffer (illustration (d), FIG. 6). On the other hand, if distress has not been indicated (the distress threshold M not having been exceeded), different operation occurs. This is the case illustrated at the end of the second and third wear intervals at the top of FIG. 5. At the end of the second wear interval, the record buffer has been filled with M2' and N2' and thus storing of new data not related to the second group should begin at the end of the second group. But, the record buffer has been filled with some number of records designated as X.S. in the top of FIG. 5 which are of no value since they did not amount to an excessive number within the wear interval. These may be thrown away and therefore they may be written over by the third group. Therefore, the designation of the point in the record buffer where the third group of records may occur is a lower address number than the current address being used in storing of M3, at the end of the second wear interval.

With these factors in mind, a series of steps 17 in FIG. 7 will cause an R decrement to be generated equal to the difference between an R pointer and an N pointer. The R pointer is the current address being used to store the M3 records at the end of the second interval. The N pointer is a saved address indicative of the last address utilized in storing the N2 records of group 2. This allows sliding the record buffer address back so that the third group can be contiguous with the end of the second group. Then an R counter (a count which continues upwardly, rather than recycling back to a low address value as the R pointer does) is decremented by having the R decrement subtracted therefrom. The R pointer is then updated to equal the N pointer, thereby causing the address for the first record of the third group to be next higher than the address of the last record of the second group. And the beginning address for the particular group of records is recorded as being equal to the R pointer. Then the noise interrupt program of FIG. 7 ends at point 18, and any other program which had been interrupted thereby is returned to utilizing ordinary interrupt handling processes.

DATA ACQUISITION—FIG. 8

Referring to FIG. 8, a real time interrupt, once each millisecond, causes the sampling of all of the probes on the engine at the one kilohertz data acquisition rate. Ideally, the probes will be sampled simultaneously. But, hardware constraints, such as use of a single multiplexed A/D, or a single A/D bus system, may require successive sampling. In this embodiment, during each interrupt, all of the probes are sampled about one-tenth of a millisecond apart from each other. The data acquisition interrupt is reached through an entry point 1 in FIG. 8, and a first test 2 determines whether data acquisition operation has been initiated or not. Upon initial power-up, a negative result of test 2 will cause a series of steps 3 to: reset a group counter (G) to "one" (indicating that there has not as yet been collected a first group of threshold-exceeding samples indicating ten times normal wear); reset a group counter (G') to one (indicating that a first group of records has not yet been classified); reset a record pointer (R PTR) to "one" (indicating that the first record is about to be made as a consequence of one of the probes having a signal magnitude in excess of the record threshold); set a probe pointer (P) to the highest-numbered probe (3 in the present embodiment) so that when advanced, the probe pointer will be pointing at the first probe; set I=1 (indicating the first wear interval is about to start); reset M and N to zero; and set the initialize flag. In all passes through data acquisition interrupt program of FIG. 7, subsequent to the first pass on power-up, the results of test 2 will be affirmative, thus bypassing the initializing steps 3.

Routine Sampling of Data

Once initialized, the iterative steps of the data acquisition interrupt program continue with steps 4 in which the P pointer is advanced and the A/D for probe P is started, after which a test 5 determines whether the A/D converter related to the probe identified by P pointer has completed the conversion, or not. The program hangs up on test 5 until the A/D converter for the P probe is complete, after which an affirmative result of test 5 reaches a series of steps 6 in which the A/D converter for the next probe (one in advance of probe P) is started, the history buffer for probe P has stored in it the A/D results from the A/D converter for probe P, and the history buffer pointer (designating the particular part of the cyclic history buffer) for probe P is advanced. The history buffer for each probe may be of any desired size, but in the example herein they must have at least 27 sample storage locations each, since the records of the present embodiment include 27 samples of history along with 77 samples which are captured on-the-fly following a threshold exceedance. Thus any available memory locations may be utilized as history buffers by means of address portions relating to the history buffer as a whole, address portions relating to the particular probe involved, and address portions corresponding to the history pointer for the particular probe (the probe's portion of the history buffer).

In FIG. 8, for each sample read into the history buffer in the steps 6, a test 7 determines whether a record is already in progress or not. If not, a negative result of test 7 reaches a test 8 which determines if a record has been initiated or not. The initiation of a record, as described below, occurs whenever a threshold is exceeded (on any one of the probes) for the first time following the completion of a previous record. A negative result of test 8 will reach a test 9 which determines if the last sample to be read exceeds the negative threshold for this probe, or not. If not, a test 10 determines if the most recent sample exceeds the positive threshold for this probe. If the most recent sample does not exceed the record threshold in either the positive or the negative direction, negative results of tests 9 and 10 combine to reach a test 11 to see if the third probe has been read during this iteration. If not, a negative result of test 11 returns the program to step 4 to cause reading of the next sample, and starting the A/D converter for the sample following the next sample. When all three probes have been sampled, an affirmative result of test 11 will reach a test 12 to see if a record has been declared. Since threshold exceedances only occur some tens of times per million interrupts, usually no record is declared and a negative result of test 12 reaches the program end point 14.

In cases where none of the samples exceed the threshold, passage through steps and tests 4–11 three times, (with the A/D converter for each probe being read once and the results thereof stored in the corresponding history buffer for the probe) and ending through test 12 is all that occurs. This can go on virtually indefinitely in subsequent passes through the data acquisition interrupt routine, so long as no threshold is exceeded. In such a case, all that occurs is that data is stored in the history buffer in a cyclical fashion. When each history pointer reaches maximum and returns to a minimum setting, the newly incoming data will simply be overwritten over the oldest data in the history buffer, in a cyclical fashion.

Declaring a Record

Eventually, one of the three probes may provide a signal in excess of its record threshold so that one of the tests 9, 10 in FIG. 8 will be affirmative. It does not matter which of the three probes does this; in any event a record is declared as a consequence of one of the three probes having a signal in excess of either its positive or negative threshold. In such a case, an affirmative result of test 9 will cause a step 15 to increment the negative distress counter for probe P within the current alarm interval (I) storage area. Or, an affirmative result of test 10 will cause a step 16 to increment a positive counter. Then, a series of steps 18 will record the source of the exceedance as the current probe, store the current threshold values for all three probes, and set the record initiated flag. If the first or second probe caused setting of the record initiated flag in steps 18, test 11 will again be negative so the program will return to step 4 until all three probes have been read during the present cycle. Once all three probes have been read, then tests 11 and 12 will be affirmative causing the program to advance to a test 19 to ensure that storage of a record at R in the record buffer will not write over a record that has not already been classified. In test 19, R Max is the total number of records that can be stored; the R counter keeps track of how many have been stored; and the R' counter keeps track of how many have been classified (and analyzed, if post classification analysis is utilized). If the buffer is full, a negative result of test 19 will reach a step 20 which resets the record initiated flag, thereby causing the record to become undeclared. If the buffer is not full, an affirmative result of test 19 reaches a series of steps 21 which initialize moving the history buffer for one of the probes to the record buffer for that probe.

Moving the History Data

Specifically, in steps 21, the P pointer is advanced (so during the first pass it will point to the first probe); the end of the history for the present record for the particular probe is stored as being equal to the current setting of the history pointer for that probe; this memorizes the point at which taking the history from the history buffer and putting it in the record buffer will be complete as described hereinafter; then the history pointer for the present probe is decremented by 26 samples so as to go back to a point in the history buffer which will include 27 samples of the present record (the pulse wave shape to be stored as a consequence of the last triplet of incoming data including one data magnitude which exceeded a threshold). Then in a series of steps 23, one sample of the record buffer for the current record, R (which is initialized as the first record in the steps 3), relating to the current probe, P, is set equal to the sample in the history buffer being pointed to by the history pointer. In the first pass through the steps 23, the first sample of the history buffer for probe 1 is moved into the first sample of the record buffer for probe 1, for the first record. Then the record buffer pointer for probe P is advanced and the history pointer for probe P is advanced. Then, in a test 24, it is determined whether or not all of the history has been moved into the record buffer for this particular probe by comparing the present state of the history pointer for probe P with the maximum history previously stored for probe P. If the complete history has not been moved to the record buffer, a negative result of test 16 causes the steps 15 to be repeated for successively advancing samples of the history buffer and the record buffer. Eventually, all of the history for probe P will have been moved to the record buffer for the first record for the first probe, in which case a negative result of test 24 will reach a test 25 to determine if all three probes have completed movement of samples from their history buffers to their record buffers. Initially, since the first probe has its history moved to the record buffer first, P will equal 1, so a negative result of test 17 will cause the steps and tests 21-25 to be repeated for the second probe and ultimately for the third probe. When the history for all three probes has been moved to the record buffer, an affirmative result of test 25 causes a series of steps 26 to be reached: a sample counter is set to 77 (indicative of the 77 samples of the record for each probe to be taken directly into the record buffer, as well as being stored in the history buffer); and, a record in progress flag is set and the record initiated flag is reset. At the conclusion of steps 26, the end of the program is reached at the point 14.

Capturing the Remaining Record On-The-Fly

In FIG. 10, the next time a data acquisition interrupt occurs, the result of test 2 will be affirmative, bypassing the steps 3 since initialization has already occurred. Once a threshold has been exceeded and a record declared, the next subsequent data acquisition interrupt will cause the routine of FIG. 8 to pass through an affirmative result of test 2 to the step 4 and P is advanced from the third probe to the first probe once again, and the A/D for the first probe is started. As soon as test 5 is affirmative, a series of steps 6 start the next subsequent A/D, store the current sample in the history buffer for the present probe, and advances the history buffer pointer for that probe for use in the next cycle. Now, however, test 7 will be affirmative because there is a record in progress (one of the previous samples having exceeded a threshold).

An affirmative result of test 7 in FIG. 8 reaches a pair of steps 30 in which the record buffer for the first record and the first probe is set equal to the A/D result for the first probe and the record buffer pointer for that probe is advanced for use in a subsequent cycle. Then a test 31 determines if all three probes have been sampled in this particular pass through the data acquisition interrupt program of FIG. 8. If not, the program reverts to step 4 to handle the sample of the next probe in sequence until all three probes have had their A/D samples read into the record buffer, and the record buffer pointer therefore has been advanced. When all three probes are complete, an affirmative result of test 31 reaches a step 32 which decrements the sample counter and then a test 33 which determines if the sample counter has reached zero, indicating that 77 samples subsequent to a threshold exceedance have been stored for all three probes. If not, the program ends at the point 14 for the current interrupt.

Successive data acquisition interrupts cause the program of FIG. 8 to continue to pass through the steps and tests 4-7 and 30-33 until, finally, the sample counter has been decremented from 77 all the way to zero. This indicates that 77 samples have not only been put into the history buffer but have been placed directly in the record buffer as well, for each of the three probes. This means that the record buffer now contains the original 27 samples transferred from the history buffer in steps 21 and 23 and the additional 77 samples taken directly into the record buffer in steps 30. During this time, the history buffer is maintained up-to-date in step 6 so that whenever there is a subsequent exceedance, the history will be available.

Completing a Record

Eventually, when all 77 on-the-fly samples have been stored in steps 30 of FIG. 8, for all three probes, an affirmative result of test 33 reaches a series of steps 35 in which the speed to be recorded with this record is set equal to the current engine speed (FIG. 4); the power lever angle (P.L.A.) for the record is the current value (not shown); the time is the current time; the record pointer (R PTR) is incremented (since a complete record of triplets of 104 samples each has been completed); the corresponding R counter is incremented (this keeps track of the total number of records stored, even after the R PTR reverts to the lowest address); a temporary count (M) of records is incremented (for use as described with respect to FIG. 5); and the record in progress flag is reset. If desired, a history of engine speed over the last 5 seconds or so may be recorded, for print-out with classification results, to aid in subsequent operator interpretation of engine conditions.

Testing for Abnormal Wear

In FIG. 8, a test 36 determines if a distress flag is set (as described hereinafter). Initially it is not, so a test 37 is reached wherein the number of records M (the number of times that a threshold exceedance has recently occurred) is compared against a distress threshold. As described briefly hereinbefore, the distres threshold is preferably taken to be some value on the order of ten times the normal amount of records which may occur in a healthy engine during a given test, flight, or other distress-related interval of time. The distress threshold is set equal to some given number of counts such as 20 or 30 counts. The distress threshold test 37 simply compares the number of records which have been taken since the last indication of distress or since the start of the current wear interval, with the number of records which are indicative of a distress value of wear (a unit of distress). In the case of the first few records taken, the result of test 37 will be negative causing the program to end at point 14.

Thus, as a consequence of having one probe sample exceed the threshold, a record of 104 samples for each of the three probes (along with other data) will have been placed in the record buffer and the record pointer incremented. Then, in a subsequent data acquisition interrupt after completion of the record, data acquisition continues as described hereinbefore. Ultimately, when some number of records indicative of distress have been made because of threshold exceedances, an affirmative result of test 37 in FIG. 8 will reach steps 40 in which a distress flag is set (indicating that the M portion of the record is complete); an N PTR (described hereinafter) is set equal to the current value of the R PTR; and the point where the next M records will be stored is marked by setting BEG M equal to the R PTR. And then the program ends through the point 14.

Completing a Group of M & N Records

As described briefly hereinbefore, once a distress threshold number, M, of records (ten times the normal number of records which should occur in a healthy engine within a given alarm interval) has been collected, an additional number, N, of records is collected to provide a complete classification group consisting of M+N records. To achieve this, data samples are continuously taken as described with respect to steps and tests 4–7 and compared against thresholds to determine if an exceedance requires declaring another record, as described with respect to steps and tests 8–11. When a record is declared, the related (26 prior and one current history) samples in the history buffer are moved to an appropriate portion of the record buffer, and the remainder of the record is taken on-the-fly as described with respect to steps and tests 4–7, and 30–33, hereinbefore. The next time that a record is completed as indicated by an affirmative result of test 33, the steps 35 are performed and test 36 is now affirmative since the distress flag was set in the steps 40 at the completion of the prior record, which was the Mth record for the present group. This causes steps 42 to be reached in which the number N is incremented and an N pointer is advanced. Since the R pointer is advanced in step 35 to be ready for the next record in sequence and the N pointer is set equal to the R pointer in the steps 40, the N pointer initially points to the first of the N subsequent records. The use of the N pointer keeps track of the advancing storage position within the record buffer where the N records are being stored.

In FIG. 8, a test 43 determines if the current, Nth record is the desired maximum number of N MAX records or not. If not, the routine of FIG. 8 ends at point 14. But when the required number of subsequent records is reached, an affirmative result of test 43 reaches a series of steps 44 where N is reset to zero, the designation of the current group, G, is incremented, the beginning record for the current group is identified as the beginning of the M portion of the group, as established either in the step 40 of FIG. 8 or in the step 16 of FIG. 7, as described hereinbefore. And the classification flag for group G is set meaning that group G has to be classified and has not yet been. The distress flag is reset so as to enable collecting a whole new group of records, and distress may be indicated to a pilot or test apparatus operator, as appropriate. Following the steps 44, the routine of FIG. 8 ends at point 14. This leaves the apparatus in condition where it has a group to be classified; however, sampling of the probes on a kilohertz (or so) rate, declaring records when any probe has a threshold exceedance, collecting complete records until a distress threshold number of them have been completed (within the given alarm interval) and adding an additional records thereto to provide a full classsification group, will continue on a real time interrupt basis as described with respect to FIG. 8 hereinbefore. Once a number of thresholds have been exceeded and the corresponding number of records of triplets, containing 104 samples each, for each of the three probes, have been made, the fact that a unit of distress has occurred (exceeding the distress threshold in test 37, FIG. 8) is indicated by the distress flag.

RECORD CLASSIFICATION—FIG. 9

The record classification routine of FIG. 9 is reached on a periodic basis in each pass through the major cycle of the computer, other than during interrupts (as described hereinbefore). Entry of the record classification routine through a point 1 in FIG. 9 reaches a test 2 to determine if classification of the G' group of records is required. If not, the program is ended through a point 3 without performing any further steps in the record classification routine of FIG. 9.

Whenever distress has been indicated and a group (G) of records (M+N in number) have been stored in the record buffer (as described with respect to FIG. 8), but the group (G') has not yet been classified, the record classification routine of FIG. 9 will see an affirmative result of test 2, reaching a plurality of steps 3: the maximum sample is set equal to the maximum sample in a given embodiment (which is established as 104 samples in the present example): a group counter (which counts the records within the current group as they are classified) is set equal to zero; and the record pointer (R' PTR) utilized in record classification (in distinction with that, R PTR, used for data acquisition, FIG. 8) is set to the beginning record of the group of distress records to be classified (the beginning record set in steps 17 of FIG. 7, or in steps 44 of FIG. 8), so that it will point to the first record of the group. This allows the accumulated records to be classified through the program of FIG. 9 interleaved with continuous acquisition of data in new records through the program of FIG. 8, on an ongoing basis, as shown in FIG. 2.

In FIG. 9, the iterative process begins in a series of steps 4 by advancing the R' pointer and incrementing the R' counter and setting the probe pointer, P', equal to the highest numbered probe, which in the present embodiment is three. Then a series of steps 5 advance the P' pointer (so that in the first pass it will point to probe 1), a sample buffer is set equal to the record buffer for the current record and probe (implying a data move of all 104 samples for one probe from the record buffer to a sample buffer used during analysis), a sample counter, S, is set to zero and a category counter, C, is set to zero. (The move of a record for a probe to the sample buffer is not required since all the data may be accessed, when desired, from the record buffer. However, the description is much simpler when reference to R' and P' is not required for each sample.) Then in a step 6, the sample counter is incremented to point to the first sample in the sample buffer. Then a test 8 determines if the absolute value of the magnitude of the first sample (a magnitude indicative of probe output voltage in the present embodiment) exceeds the record threshold for that probe (in general, the same threshold used in tests 9 and 10 and saved in steps 18 of FIG. 8). If not, a test 10 in FIG. 9 determines if all 104 samples have been tested or not. If not, a negative result of test 10 returns to step 6 to increment S and examine the next sample of the record for the particular probe, for threshold exceedance. Assuming that the first probe in the record being examined did not have any signals exceeding its threshold (meaning the record was declared as a consequence of activity on one of the other probes), eventually test 10 will be affirmative following 104 negative results of test 8. This will reach a step 11 where the category (the type of signal) for this probe within this record is set to zero, indicating that there is no record and therefore nothing to be categorized for this probe within this record. Then a test 12 is reached to determine if the samples for all three probes have been interrogated in this record or not. If not, a negative result of test 12 will return to the series of steps 5 in which P' is advanced and a new record of samples for the second probe is brought into the sample buffer from the record buffer, S and C are reset to zero and then step 6 increments S so as to point to the first sample in the record for the second probe. Depending upon whether there is any record at all for this probe, or if this probe has a syntactic pulse shape or is a gross signal, a threshold may or may not be exceeded. If not, the process will repeat through step 11 as described hereinbefore. If there is a threshold crossing as a result of one of the samples having a magnitude in excess of the record threshold for the particular probe, test 8 will eventually be affirmative leading to a step 13 where the sample at which threshold exceedance occurred is set equal to S, the current sample number. Then a test 14 determines if this is the first probe being interrogated or not. If it is, an affirmative result of test 14 will lead to a first probe routine 15 (described hereinafter with respect to FIG. 10) which compares the sample record with characteristics of various categories of signals which can be sensed on the first probe. If test 14 is negative, a test 16 will determine if the current sample record being interrogated is for probe 2 or not. If it is, the routine will advance to a second probe routine 18 (described hereinafter with respect to FIG. 11) which compares against the various types of signals which can be sensed on the second probe. But if test 16 is negative, then the routine of FIG. 9 advances to a third probe subroutine 20 (described hereinafter with respect to FIG. 12) which compares against the various types of signals which can be sensed on the third probe. Regardless of which routine is used and dependent upon which probe is being analyzed, the program will advance from one of the subroutines 15, 18 or 20, to a decision subroutine 21 (which is described with respect to FIG. 13). In the decision subroutine 21, the results of attempting to classify the given probe record into any one of a number of categories is analyzed and one of the categories is picked (if possible).

In FIG. 9, when the sample buffer has been loaded for each of the three probes and the corresponding sample records analyzed, eventually test 12 will be affirmative causing the program of FIG. 9 to reach a step 22 in which the group counter is incremented. Then a test 23 determines if the group counter has advanced to designate a full group of M+N records. If not, a negative result of test 23 causes the program of FIG. 9 to return to the series of steps 4 so as to advance the R' pointer, increment the R' counter and set P' equal to 3 so that the next record in the classification group can be passed through the iterative part of the routine of FIG. 9 to have the samples for each of the three probes categorized. When an entire group of records (such as thirty records or so), each having 104 samples for each of three probes, has been classified, test 23 will be affirmative causing the program of FIG. 9 to advance to a step 24 in which the classification flag for the G' group is reset. Then a test 25 determines if further distress analysis routines are available in the present embodiment of the invention, as determined by a permanent distress-analysis-available flag. If so, a temporary distress analysis flag is set in a step 26. In this embodiment, test 25 is negative, so G' is incremented in a step 27 so as to point to the next group in the sequence. Then the program will finally end at the point 3. An example of distress analysis appears in a commonly owned, copending U.S. patent application entitled "Statistically Correlated Electrostatic Engine Diagnostics", Ser. No. 453,961 filed contemporaneously herewith by Zwicke et al now U.S. Pat. No. 4,590,562.

In subsequent calling of the record classification program of FIG. 9, if all existing groups have been classified, test 2 of FIG. 9 will be negative causing the program to end at point 3. The utilization of the classification flag for the G' groups permits classification to be done asynchronously with acquisition of groups of records to be classified. Thus if the classification program falls behind the acquisition of new records (which is usually unlikely but might possibly happen during a highly active engine condition), so long as the record buffer is not full, data acquisition can continue.

FIRST PROBE SUBROUTINE—FIG. 10

The first probe subroutine 15 of FIG. 9 is reached in FIG. 10 through an entry point 1 and a first step 2 sets C MAX for the first probe (P') equal to 6, since the present embodiment has provision to discriminate between six different categories which may be sensed by the first probe. Of course, this number can vary, in any given embodiment. The iterative process of the first probe subroutine begins in FIG. 10 by a series of steps 3, the first of which increments the category counter, C, so as to advance it from the zero setting of steps 5 in FIG. 9 to cause the record set in the sample buffer in steps 5 of FIG. 9 to be examined for the first category (C=1) of the first probe in the subroutine of FIG. 10. Then a parameter buffer is loaded with the parameters shown in illustration (c) at the top of FIG. 6 for the first probe and the first category, as set forth in Table 2 of the aforementioned Zwicke et al applications. A quality factor, Q, (an indication of how well a given sample record fits into a given category) is set to zeros, and a degrade factor (utilized in determining Q) is set to zeros.

In FIG. 10, a test 4 determines if the current category to test the sample against is the first category or not. Initially it is, so an affirmative result of test 4 reaches a step 5 in which a sign is set equal to plus. This sign value defines the polarity (+ or −) of the primary, threshold-exceeding pulse of a pulsatile category; a record with an opposite pulse cannot be of that category. This can be achieved by having a sign value which is set to a positive integer in contrast with being set to a negative integer, or in any other way as desired. Then a narrow pulse subroutine, described hereinafter with respect to FIG. 22 of the aforementioned Zwicke et al application, is called to determine if the current sample record is classifiable as an initially positive-going, narrow pulse indicative of metal rubbing on an abradable seal in the compressor, as exemplified in FIG. 57. After completion of the narrow pulse subroutine 6, the quality factor Q determined in that subroutine is stored as the Q for category 1, in steps 7. If desired, and if suitable storage capacity is available, all of the results of the processing within the narrow pulse subroutine 6 may be stored at this point in the subroutine, if desired. Then a test 9 determines if the current category is the maximum category (6 for the first probe in the present embodiment). If not, the subroutine of FIG. 10 returns to the steps 3 to set up operation for testing the sample against the second category. The category counter, C, is incremented and new parameters are brought into the parameter buffer. Then, test 4 is negative and a test 10 is affirmative so that a step 11 sets the sign to a negative value and the narrow pulse subroutine 6 is again called utilizing the parameters for probe 1, category 2 to determine if the sample record for probe 1 is classifiable as an initially negative going, narrow pulse indicative of metal-to-metal rubbing in the compressor, as exemplified in FIG. 58.

The resulting quality factor is stored for the second category and test 9 determines if all categories have been checked or not. In this case, they have not, so a negative result of test 9 reaches the steps 3 one more time. C is incremented so that parameters for probe 1, category 3 are loaded into the parameter buffer. Q and degrade are reset to zeros and tests 4 and 10 are negative leading to a test 13 which will be affirmative. This reaches a surge subroutine described with respect to FIG. 43 of the aforemention Zwicke et al application, which processes the current first probe sample record to see how closely it compares with a compressor surge record, an example of which is illustrated in FIG. 59. Then the quality factory Q is saved for the third category, results may be stored if desired, and the subroutine of FIG. 10 continues in a like manner for additional categories. Specifically, a test 15 determines a category 4 should reach a loose electrode subroutine 16, described with respect to FIG. 44 of the aforemention Zwicke et al application, wherein the parameters of Table 5 are utilized to determine if the electrode within the first probe is loose as indicated by a signature exemplified in FIG. 60. And, finally, a negative result of test 15 will reach a loose probe/rub strip subroutine 17, described with respect to FIG. 45 of the aforemention Zwicke et al application, to determine if probe 1 had a loose probe connector, as exemplified by the waveform of FIG. 61, using the parameters of Table 6 for probe 1, category 5. Then Q for the fifth category is set in steps 7; test 9 is negative, and C is incremented to 6 in steps 3. Again test 15 is negative, reaching the subroutine 17, but this time to determine if a rub strip (compressor abradable seal) has peeled off, by means of parameters illustrated in Table 6 for probe 1, category 6. An exemplar of the signature of a rub strip peeling off is illustrated in FIG. 62. When the sample record for the first probe has been compared against all six categories of the present embodiment, the record classification program of FIG. 9 is reverted to through a return point 18. In FIG. 9, the decision subroutine 21 is reached, as described with respect to FIG. 13 hereinafter, and the program then reverts to the steps 5 for the next probe in the sequence, eventually reaching the second probe subroutine 18 as illustrated in FIG. 11.

SECOND PROBE SUBROUTINE—FIG. 11

In FIG. 11, the second probe subroutine is entered through a point 1 and a step 2 sets the maximum number of categories for the second probe equal to 8. These are the categories for which exemplary wave shapes are illustrated in FIG. 60-FIG. 67, respectively. The iterative part of the second probe routine of FIG. 11 is similar to that described for the first probe with respect to FIG. 10. Specifically, the steps 3 and 4 are the same but for the second probe, tests 5 and 6 call a wide pulse subroutine 7, described with respect to FIG. 34 hereinafter, after a step 8 sets the sign negative; a test 10 causes setting of a positive sign in a step 11 before calling the wide pulse subroutine 7. Then tests 12 and 13 cause categories 4 and 5 to be examined with plus and minus signs, as set in steps 14 and 15, by means of the narrow pulse subroutine 16. Test 17 causes the record to be examined in the loose electrode subroutine and causes the record to be compared against category 7 and then category 8, in the loose probe/rub strip subroutine 19. When the sample record has been compared against all eight categories, a test 20 causes the record classification program of FIG. 9 to be reverted to through a return point 21.

In FIG. 9, the decision subroutine 21 is performed with the Q values collected by the second probe subroutine of FIG. 11 and then the third probe is handled by negative results of tests 14 and 16 in FFF. 9 reaching the third probe routine 20 of FIG. 12.

THIRD PROBE SUBROUTINE—FIG. 12

In FIG. 12, the third probe routine is reached through a point 1 and a step 2 sets the maximum number of categories equal to 14. In the iterative part of the program, the steps 3 are performed in the same fashion as in FIGS. 10 and 11 but fetch the parameters for the third probe categories. As in FIG. 10 and FIG. 11, a series of tests 4-16 cause the routine to examine the sample record for the third probe against 14 catgories, exemplary wave shapes for which are illustrated in FIG. 62 and in FIG. 68-FIG. 80 hereinafter. A series of steps 19-24 set the sign as appropriate and, depending upon the particular category, the sample record is examined for its likelihood of being in that category by the narrow pulse, wide pulse, and loose connector/rub strip subroutines 26-28 in the case of categories 1-3, 4-9 and 10, respectively. The sample record is examined for categories 11 and 12 by an abnormal A/B chop subroutine 30, described with respect to FIG. 54 hereinafter, for category 13 in a normal afterburner chop subroutine 31, described with respect to FIG. 55 hereinafter, and for category 14 in an acceleration/deceleration subroutine 32, described with respect to FIG. 56, hereinafter. In each pass through the routine of FIG. 12, the steps 33 are the same as steps 7 in FIG. 10 hereinbefore, except relating to the third probe, and when the record has been compared against all categories, a test 34 causes the record classification program of FIG. 9 to be reverted to through a return point 35.

In FIG. 9, the decision subroutine 21 is called with respect to the third probe, which completes the examination of all three probes for one given record, as described with respect to FIG. 9 hereinbefore.

Of course, if new categories are found to be useful for any probe, new subroutines and expansion of each probe subroutine can be made, as desired.

DECISION SUBROUTINE—FIG. 13

Figure 13:
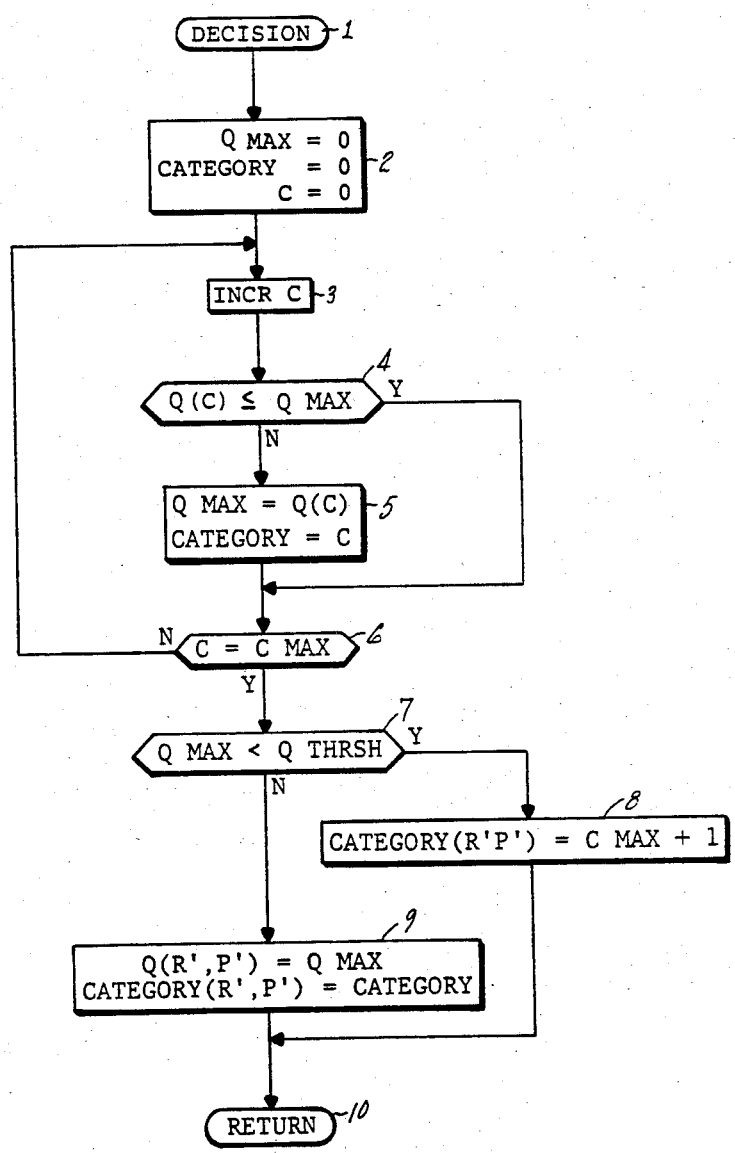

In each of the subroutines called by the first probe, second probe, and third probe subroutines of FIG. 10—FIG. 12, the relative likelihood that the given sample record fits into the category related to the particular subroutine is manifested by the quality factor, Q. The manner in which this quality factor is developed, for each sample record as it is processed through each subroutine, is described with respect to FIG. 24 through FIG. 56 hereinafter. In the present embodiment, the quality factors generally range from zero to one, although this may differ in dependence on the manner in which the present invention is implemented. For the purposes of describing the decision subroutine illustrated in FIG. 13, it suffices to say that quality factors, Q, are assigned for each sample record of each probe with repect to each of the categories which may relate to that probe, and these quality factors range from zero to unity. Following each of the individual probe subroutines 15, 18, 20 of FIG. 9, the record classification program calls the decision subroutine 21, illustrated in FIG. 13. In FIG. 13, the decision subroutine is entered through a point 1 and a series of steps 2 set a temporary value, Q MAX, equal to zero; set the category equal to zero; and set the category counter, C, equal to zero. Then a first iterative part of the subroutine of FIG. 13 commences with a step 3 which increments C and a test 4 determines if the quality factor assigned to category C is less than or equal to the maximum quality factor. For the first category in the set of categories for any given probe, test 4 must be negative since Q MAX is set at zero in the steps 2. Thus Q MAX becomes set in one of the steps 5 to the Q for the current category and the category for the probe is set equal to C. That is to say, the winning category is set to be equal to the category (identified by C) for which Q MAX is most recently set equal to Q of the current category. Then a test 6 determines if C MAX (as set in step 2 of FIG. 10, FIG. 11 or FIG. 12) has been reached or not. If not, this means all of the categories for the given probe have not had their Q values examined against the others as yet, and a negative result of test 6 will cause the decision subroutine of FIG. 13 to revert to step 3, where C is incremented to identify the next category in the sequence. If its quality factor is not equal to or less than the previously determined maximum, its value is taken as the maximum and it is identified as the category for that probe in the steps 5. When all of the categories for the given probe have been examined, an affirmative result of test 6 will reach a test 7 in which Q MAX is compared against some threshold value for Q which may be established. For instance, the Q threshold may be set at 0.5, in the general case of the present exemplary embodiment. If a given category has too low a Q value, an affirmative result of test 7 will reach a step 8 in which the category for the record under test for the current probe is set equal to the maximum category number plus 1, which is used to define the record as of "unknown" characteristics. Thus for the first probe, if Q MAX is zero (meaning the particular sample record does not in any way resemble any of the six permitted categories for the first probe), or if the maximum Q is less than 0.5, the category for this sample record for this probe will be set (in step 8) to seven, meaning the category is unknown. On, the other hand, if the highest Q value for the given sample record for the particular probe is equal to or greater than 0.5, a negative result of test 7 will reach steps 9 in which the quality factor, for the particular record involved and for the particular probe involved, is set equal to the Q MAX provided in the steps 5. And the category for the particular record and particular probe is set equal to the category determined in the steps 5. Following either steps 8 or 9, the classification program of FIG. 9 is reverted to through a return point 10 in FIG. 13.

DISTRESS ANALYSIS—FIG. 14

Isolating engine distress to a particular section of the engine is performed in one embodiment of the invention simply by analyzing the categories provided by the routine of FIG. 9 and subroutines of FIGS. 10-13 with respect to engine section. The particular manner in which the subroutines called by the subroutihes of FIGS. 10-12a is irrelevant to the present invention. Classification may be of the type disclosed in the aforementioned Zwicke et al application. What is relevant is that if there are indications of fault, however determined, these can provide an indication of the section of the engine most likely to require further inspection for component damage or irregularities. In FIG. 14, the distress analysis routine is reached through an entry point 1 and a test 2 determines if the distress analysis flag has been set in FIG. 9, or not. In this embodiment, the distress analysis available flag is always set so that test 25 of FIG. 9 is affirmative each time that a record has been classified. Thus, whenever a record has been classified, the distress analysis flag will have been set. Otherwise, it will not, and a negative result of test 2 will cause the program to end at a point 3. When distress analysis is required, an affirmative result of test 2 reaches a series of steps 4 which set the R' pointer to one less than the first record of the group; establish the group counter at zero; set local counters, one for each of probes 1 through 4 to zero; set a local maximum count factor equal to zero; and set the selected section equal to zero.

In the embodiment of the invention shown in FIG. 14, the values of P' relate to the various probes and sections as shown. That is, the upstream-most probe is probe 1, indicating failure in the compressor, and is identified by P' equal to 1. The second probe in the stream is probe 2, identified by P' equal to 2, and relates to failure in the high turbine. The third probe in the stream is the flameholder probe 27, utilizing a P' value of 4, and indicating distress in the low turbine. And, the last probe in the stream is probe 3, identified by P' equal to 3, and indicating distress in the afterburner.

In the iterative portion of the embodiment of FIG. 14, steps 5 advance the R' pointer, initially to point to the first record in the group, and subsequently to sequential records; and P' is set equal to 1. Then a test 6 determines if the category for the first probe in this record is other than the zero, no record category. If it is, an affirmative result of test 6 reaches a step 7 to increment the counter for this probe (and therefore for the compressor section). Even if the category is unknown, in the embodiment relating to 10-13, any event in the upstream-most section of any given record will cause its counter to be incremented. If a category for probe 1 in this record is zero, an affirmative result of test 6 reaches a step 8 to set P' equal to 2 so that a test 9 can determine if the second probe has any non-zero category. If so, its counter will be incremented in step 7. If not, a step 10 will set P' equal to 4 to determine if probe 27 had a non-zero category. If so, a negative result of test 11 will cause its counter to be incremented in step 7. If none of the first three probes in the gas stream have a non-zero category, an affirmative result of test 11 will reach a step 12 to set P' equal to 3 so that a test 13 will determine if the last probe had a non-zero category. If so, its counter will be incremented in step 7. If none of the probes had a category, an affirmative result of test 13 will reach a step 14 to set a system fault indication. Then a test 15 determines if the entire group of records have been analyzed, and if not, steps 5 are reverted to to test all four probes for the next record. Thus, the steps and tests 5-13 will increment the counter for the upstream-most probe which had a non-zero category assigned to it in the given record.

When all of the records in the group have been analyzed, an affirmative result of test 15 reaches a step 16 to set P' equal to 4. Then P' is advanced in a step 17, initially pointing at probe 1, and subsequently at additional probes. Then the counter for P' is compared against a maximum count in a test 18. In the first pass through test 18, any count at all will be greater than the maximum count, which was initialized as zero in steps 4. Thus an affirmative result of test 18 will reach a step 19 to set the section equal to P' and set the maximum count equal to the counter of P'. Then a test 20 determines if all four probes have been examined for maximum count or not. If not, step 17 is reverted to and the next probe is compared with the prior probes. In each case where the current probe has a higher count than any prior probe, an affirmative result of test 18 will cause the current probe to identify the section and a new value of the maximum count. But whenever the current probe has a lesser count, a negative result of test 18 bypasses steps 19.

In FIG. 14, when all four probes have been analyzed, an affirmative result of test 20 reaches steps 21 to reset the distress analysis flag and increment G', thereby enabling classification of a subsequent record. And then the program is ended through the point 3.

SECOND EMBODIMENT—FIGS. 15 AND 16

A simpler embodiment of the invention, that achieves essentially the same result as the embodiment of FIG. 14, is illustrated in FIGS. 15 and 16. A data acquisition interrupt in FIG. 15 is reached through an entry point 1 and a test 2 determines if the routine has been initialized since power-up or not. If not, a series of steps 3 set M (of FIGS. 7 and 8) equal to zero; initialize R and R' at 1; set P equal to 4; and set the initialize flag. Then a step 4 advances P, initially to point to the first probe, and subsequently to point to successive probes in a sequence. In the embodiment of FIGS. 15 and 16 (as well as that of FIGS. 17 and 18 hereinafter), it is assumed that the value of P is arranged in gas stream order, whereby P=1 identifes probe 1, P=2 identifies probe 2, P=3 identifes the flameholder 27, and P=4 identifies the hoop probe 3.

In FIG. 15, a test 5 determines if a record has been initiated as yet or not. Initially, it has not so a step 6 will start the A/D for the current probe, and a test 7 determines when conversion is complete. Then a test 8 determines if the probe has a value greater than a positive threshold value. If so, steps 9 will increment the distress counter for the current distress interval and probe, and increment a local, plus section counter for the current probe. If not, a negative result of test 8 reaches a test 10 to determine if the probe has a value less than a negative threshold. If so, steps 11 will increment a minus distress counter for the current interval and probe and will increment a local, minus section counter for the probe. If the probe has neither a positive or a negative signal in excess of threshold, a negative result of tests 8 and 10 reach a test 12 to determine if all four probes have been sampled or not. If not, the program of FIG. 15 reverts to step 4 to handle the next probe in the sequence.

In FIG. 15, in the event that the probe had either a positive or a negative threshold crossing, following steps 9 or 11, a step 13 will set a record initiated flag. This may be set by any one of the four probes, for teting later. When all four probes have been sample, an affirmative result of test 12 reaches a test 14 to determine if a record has been initiated. If not (which is the usual case since only tens of records out of a million will have threshold crossings in a usual situation), a negative result of test 14 will cause the program to end at a point 15. But once there has been a threshold crossing, test 14 will be affirmative reaching steps 16 in which a record timer is set equal to the current time; a record in progress flag is set; M is incremented; and the record init flag is reset. Then a test 17 determines if M has reached a distress threshold (as described hereinbefore). If not, the program ends through point 15. But if M has exceeded a distress threshold, then an affirmative result of test 17 reaches a step 18 to set the classification flag. When the classification flag is set, this is because a group of records (M in number) have been collected as a consequence of one or more of the probes exceeding thresholds. In each record, however, only one of the probe distress counters will be incremented. This will be the first probe and therefore the upstream-most probe in the sequence of probes in each case. The reason is that once record init has been set in step 13, reversion to step 4 to test the next probe in the gas stream will cause step 5 to be negative, bypassing the A/D conversion. The only reason for passing through step 5 is to keep the P pointer pointed to correct probe for subsequent use.

Once a group of records have been collected, classification in accordance with section is accomplished in FIG. 16.

In FIG. 16, the record classification routine of the current embodiment is reached through a point 1, and a test 2 determines if the classification flag has been set or not. If not, a negative result of test 2 reaches a test 3 to determine if M is zero or not. In the general case, when record classification is not being accomplished, test 3 is determining whether or not the end of a distress interval has caused resetting of M, as in step 13 of FIG. 7, hereinbefore. In FIG. 16, anytime M is zero valued, steps 4 will reset to zero the plus and minus section counters for all of the probes 1 through 4. Otherwise, a negative result of test 3 causes steps 4 to be bypassed. In either event, the program then ends at a point 5.

In FIG. 16, if a group of records have been collected and the classification flag is set, an affirmative result of test 2 will reach steps 6 which reset the selected section and a maximum count equal to zero. In the iterative part of the program, a step 7 advances P, initially to point to the first probe, and subsequently to the other probes. A test 8 determines if the plus section counter for the current probe is equal to or greater than the established maximum count; initially, any count at all will be greater than the initial maximum count of zero and an affirmative result of test 8 will reach steps 9 to establish the section as +P (meaning a plus count for the current probe), and update the maximum count to the count of the plus section counter for the current probe. But if the plus section counter for the current probe is not greater than a previously established maximum count, steps 9 are bypassed. Similarly, a test 10 and steps 11 will examine the minus section counter for each probe with respect to a previously established maximum count and update it whenever the minus section counter is higher than any previous counter. Note that the maximum count will be the maximum count of both the positive and negative counters for all four probes; that is, the maximum count of all eight counters. A test 12 determines if all four probes have been examined, and if not, step 7 is reverted to to take the next probe in the gas stream sequence. When all four probes have been examined so as to determine which probe and whether plus or minus for that probe had the highest count, an affirmative result of test 12 will reach a step 13 to advance P once again. (Initially to point to the first probe, and then to subsequent probes). And then a series of steps and tests 14-24 determine which of the eight counters had the maximum count, and cause setting of a corresponding section indicator 25-33.

As an example, if the group of records was predominated by a high turbine blade erosion, as illustrated in FIG. 37, the predominant count would have been a negative count on the flameholder probe, which is P=3 in the present embodiment, causing the minus low turbine indicator 30 to be set. Of course, any other negative phenomenon would similarly so set the counter 30 if sensed first at the flameholder probe 27.

In the event that all of the steps and tests 14-23 reach a negative result of test 24, something is wrong so a system fault indicator 33 may be set. (25-32). After setting one of the indicators 25-33, a step 34 will set M equal to zero, so as to permit commencing the count of another group of records. And then test 3 is reached which will be affirmative in this case, causing steps 4 to reset the plus and minus section counters for all four probes. And then the program ends through point 5.

THIRD EMBODIMENT—FIGS. 17 AND 18

A third embodiment of the invention does not require any digital processing apparatus whatsoever. Instead, single shots (monostable multi-vibrators) and Schmitt triggers are utilized together with four probes to find the upstream-most probe which had the predominant amount of activity over some indeterminate period of time, which is controlled by the operator.

In FIG. 17, a generic description of apparatus which may be utilized with all four probes is shown. The probes, probe 1 and 2 being referred to as probe 1 and 2 herein, the flameholder 27 being referred to as probe 3, and the hoop 3 being referred to as probe 4 in this embodiment, are all similarly connected to signal conditioning apparatus 6, shown in FIG. 17.

In FIG. 17, the probe is connected across an impedance 7 which feeds an amplifier 8 and a filter 9 of the type described hereinbefore with respect to FIG. 1. The filter is fed to a plus single shot 10 and a minus single shot 11. These act as threshold detectors and provide a discrete signal whenever the threshold set therein is exceeded by the signal provided thereto by the filter 9. Should the threshold be exceeded in either the positive or negative direction, that indicates the beginning of a pulse or a record, and the other single shot should not be allowed to fire for some period of time, such as 60 milliseconds. To accommodate this, each of the Schmitt triggers 10, 11 feed respective AND circuits 12, 13 the output of which will fire a 60 millisecond single shot 14, 15. In this embodiment, it is assumed that the single shots, when in a normal, quiescent state, provide a "NOT" signal on a corresponding output line 16, 17. On the other hand, when the single shot is fired, it will provide a signal on an output line 18, 19 for 60 milliseconds. The "NOT" signals are fed back to the AND circuit 12, 13 of the opposite single shot, to prevent it firing during the 60 millisecond period. Thus, when either Schmitt trigger senses a threshold exceedance, one of the single shots will fire and stay fired for 60 milliseconds, and block the other single shot from firing. Additionally, the AND circuits 12, 13 are not allowed to pass the signal from a corresponding Schmitt trigger to a related single shot except when an enable signal is present on a line 20. This is to permit having a priority along the gas stream so that only the first single shot to be fired will be recognized for the next 60 milliseconds, as is described with respect to FIG. 18.

In FIG. 18, the probes 1-3 and 27 are connected in gas stream order to signal conditioners 6 of the type described with respect to FIG. 17 hereinbefore. Probe 1 has its enable line 20 connected to a suitable source 22 of voltage so that its AND circuits 12, 13 (FIG. 17) will be enabled at all times. The NOT signals from probe 1 are fed to an AND circuit 23, the output of which provides the enbable signal on line 20 for probe 2. Thus probe 2 is enabled only when neither of the single shots of probe 1 have fired. The enable signal on the line 20 for probe 2 is fed to an AND circuit 24 along with the NOT signals from probe 2 so as to provide an enable signal on a line 20 for probe 3 (the flameholder 27). And the enable signal for probe 3 is applied to an AND circuit 25 together with the NOT signals from probe 3 to provide the enable signal on a line 20 for the fourth probe (the hoop probe 3 of FIG. 1).

Anytime there is a threshold exceedance on one of the probes, all probes downstream therefrom are blocked for the next 60 milliseconds; however, a probe which is upstream of a probe which has fired within the last 60 milliseconds, may fire within that period of time; this is permitted because it is indicative of a separate event. Anytime that one of the probes has a threshold exceedance (recognized and not blocked by a probe upstream thereof), it will cause a corresponding counter 26-33 to be incremented. These counters may be as simple as a Veeder Root counter, or any other suitable counter depending on the implementation to which the invention is to be put. The counters will simply accumulate counts for plus and minus threshold exceedances of the correponding probes, the upstream-most probe prevailing in the event that more than one probe can see the event. After such period of time as is desired, an operator may reset the counters 26-33 in any suitable fashion, depending upon what counters are used. If the counters have an electrical reset feature, an operator reset pushbutton 34, connected from a source of suitable potential 36 to each of the counters by means of signal lines 37 may be used to reset the counters.

The three embodiments herein provide an indication of the likelihood of a given section of the engine having component wear indicative of engine deterioration or impending failure. The determination of abnormal wear is useful to avoid disastrous failure while the engine is in use (particularly in flight, for airborne engines) and is also useful to repair the engine before the failed component can cause severe, further engine damage.

Although the invention has been shown and described with respect to exemplary embodiments thereof, it should be understood by those skilled in the art that the foregoing and various other changes, omissions and additions may be made therein and thereto, without departing from the spirit and the scope of the invention.

I claim:

1. Electrostatic diagnostic apparatus for sensing likely engine wear events occurring in an operating gas turbine engine, comprising:

a plurality of electrostatic signal means, each including a probe to be disposed in the gas stream of an engine, for providing, when said probe is disposed in the gas stream of an operating engine, a probe signal having amplitude variations indicative of the magnitude of electrostatic charge flowing in the gas stream in the vicinity of said probe, said probes being disposed along the gas stream of said engine spaced apart from one another, whereby the gas stream of the engine flows past said probes sequentially;

signal processing means connected for response to each of said electrostatic signal means, for selectively providing a particular engine section identifying signal corresponding to the upstream most one of said probes which provides a probe signal indicative of an occurrence of electrostatic charge flowing thereby in excess of a threshold magnitude.

2. Electrostatic diagnostic apparatus according to claim 1 wherein said probe signals have amplitude variations of either positive or negative polarity and wherein said signal processing means comprises means for alternatively providing a positive particular engine section identifying signal or a negative particular engine section identifying signal in dependence on whether said probe signal indicates electrostatic charge of a positive polarity or a negative polarity, respectively.

* * * * *